(12) United States Patent
Williams

(10) Patent No.: US 9,679,431 B2
(45) Date of Patent: Jun. 13, 2017

(54) DETECTING DUPLICATE DEPOSIT ITEMS AT POINT OF CAPTURE

(71) Applicant: Bank of America Corporation, Charlotte, NC (US)

(72) Inventor: Geoffrey R. Williams, Midlothian, TX (US)

(73) Assignee: Bank of America Corporation, Charlotte, NC (US)

( * ) Notice: Subject to any disclaimer, the term of this patent is extended or adjusted under 35 U.S.C. 154(b) by 85 days.

(21) Appl. No.: 14/686,891

(22) Filed: Apr. 15, 2015

(65) Prior Publication Data

US 2016/0307388 A1 Oct. 20, 2016

(51) Int. Cl.
*G06K 9/00* (2006.01)
*G07D 7/00* (2016.01)

(52) U.S. Cl.
CPC ....... *G07D 7/0033* (2013.01); *G06K 9/00442* (2013.01)

(58) Field of Classification Search
CPC combination set(s) only.
See application file for complete search history.

(56) References Cited

U.S. PATENT DOCUMENTS

| 7,287,689 | B2 * | 10/2007 | Tidwell | G06Q 20/042 |
| | | | | 235/379 |
| 7,377,425 | B1 * | 5/2008 | Ma | G06Q 20/042 |
| | | | | 235/379 |
| 7,383,227 | B2 * | 6/2008 | Weinflash | G06Q 20/042 |
| | | | | 235/7 R |
| 8,150,164 | B2 | 4/2012 | Oh et al. | |
| 8,234,277 | B2 | 7/2012 | Thong et al. | |

(Continued)

FOREIGN PATENT DOCUMENTS

WO 2009105708 A2 8/2009

OTHER PUBLICATIONS

"Routing transit number," Wikipedia, the free encyclopedia, accessed Mar. 10, 2015 from http://en.wikipedia.org/wiki/Routing_transit_number, 14 pages.

(Continued)

*Primary Examiner* — Anand Bhatnagar
(74) *Attorney, Agent, or Firm* — Banner & Witcoff, Ltd.; Michael A. Springs

(57) ABSTRACT

Methods, systems, and computer-readable media for detecting duplicate deposit items at a point of capture are presented. In some embodiments, a computing platform may receive image data of a deposit item presented for deposit. Subsequently, the computing platform may obtain magnetic ink character recognition (MICR) information for the deposit item. Then, the computing platform may extract information from one or more visible fields of the deposit item. Next, the computing platform may compare the MICR information and the information extracted from the one or more visible fields with item history information to determine a confidence score indicative of whether the deposit item is a duplicate of a previously-deposited item. If the confidence score is less than a threshold, the computing platform may reject the deposit item at the point of capture. Alternatively, if the confidence score is not less than the threshold, the computing platform may accept the deposit item.

18 Claims, 18 Drawing Sheets

(56) References Cited

U.S. PATENT DOCUMENTS

| | | | |
|---|---|---|---|
| 8,254,697 B2 | 8/2012 | Isard et al. | |
| 8,275,715 B2* | 9/2012 | Caruso | G06Q 20/042 705/30 |
| 8,351,678 B1* | 1/2013 | Medina, III | G06Q 20/00 235/379 |
| 8,381,975 B2* | 2/2013 | Davila | G06Q 20/042 235/375 |
| 8,417,017 B1* | 4/2013 | Beutel | G06Q 20/042 340/5.86 |
| 8,433,123 B1* | 4/2013 | Csulits | G07F 19/20 209/534 |
| 8,452,106 B2 | 5/2013 | Ke et al. | |
| 8,510,224 B2* | 8/2013 | Weinflash | G06Q 20/042 705/35 |
| 8,688,579 B1* | 4/2014 | Ethington | G06Q 40/02 705/35 |
| 8,705,876 B2 | 4/2014 | Vaddadi et al. | |
| 8,712,143 B2* | 4/2014 | Tran | G06K 9/00 382/100 |
| 8,983,170 B2* | 3/2015 | Nepomniachtchi | G06K 9/00536 382/137 |
| 2002/0033884 A1 | 3/2002 | Schurr | |
| 2004/0133516 A1 | 7/2004 | Buchanan et al. | |
| 2004/0148189 A1 | 7/2004 | Stoffelsma | |
| 2005/0097046 A1 | 5/2005 | Singfield | |
| 2010/0312705 A1* | 12/2010 | Caruso | G06Q 20/042 705/45 |
| 2013/0223721 A1* | 8/2013 | Nepomniachtchi | G06K 9/00536 382/138 |
| 2014/0185947 A1 | 7/2014 | Guo et al. | |
| 2014/0233834 A1 | 8/2014 | Smith et al. | |
| 2014/0302877 A1 | 10/2014 | Johnson | |
| 2014/0305352 A1 | 10/2014 | Dowling et al. | |
| 2014/0310167 A1 | 10/2014 | Meyer et al. | |
| 2014/0316954 A1 | 10/2014 | Gelerman | |
| 2014/0324652 A1 | 10/2014 | Killian et al. | |
| 2014/0325373 A1 | 10/2014 | Kramer et al. | |
| 2014/0330713 A1 | 11/2014 | Isaacson et al. | |
| 2014/0343851 A1 | 11/2014 | Michael | |
| 2014/0355865 A1 | 12/2014 | Cantley et al. | |
| 2015/0006382 A1 | 1/2015 | Scipioni | |
| 2015/0012382 A1 | 1/2015 | Ceribelli et al. | |
| 2015/0012399 A1 | 1/2015 | Ceribelli et al. | |
| 2015/0012422 A1 | 1/2015 | Ceribelli et al. | |
| 2015/0012442 A1 | 1/2015 | Ceribelli et al. | |
| 2015/0012489 A1 | 1/2015 | Ceribelli et al. | |
| 2015/0012570 A1 | 1/2015 | Le et al. | |
| 2015/0019437 A1 | 1/2015 | Smith et al. | |
| 2015/0039388 A1 | 2/2015 | Rajaraman | |
| 2015/0039504 A1 | 2/2015 | Ebbert | |
| 2015/0058109 A1 | 2/2015 | Lange | |
| 2015/0066772 A1 | 3/2015 | Griffin et al. | |
| 2015/0073868 A1 | 3/2015 | Garman | |
| 2015/0073925 A1 | 3/2015 | Renfroe | |
| 2015/0077326 A1 | 3/2015 | Kramer et al. | |
| 2015/0088754 A1 | 3/2015 | Kirsch | |
| 2015/0088783 A1 | 3/2015 | Mun | |
| 2015/0317528 A1* | 11/2015 | Nepomniachtchi | G06K 9/00536 382/137 |

OTHER PUBLICATIONS

"Magnetic ink character recognition," Wikipedia, the free encyclopedia, accessed Mar. 10, 2015 from http://en.wikipedia.org/wiki/Magnetic_ink_character_recognition, 4 pages.

* cited by examiner

DETECTING DUPLICATE DEPOSIT ITEMS AT POINT OF CAPTURE

BACKGROUND

Aspects of the disclosure relate to computer hardware and software. In particular, one or more aspects of the disclosure generally relate to computer hardware and software for detecting duplicate deposit items at a point of capture.

Financial institutions may receive many items for deposit, including different types of checks drawn on various financial accounts. In some instances, a financial institution and its check processing systems may receive checks or other items for deposit that are duplicates of items that have already been deposited. For example, a customer of the financial institution may forget that he or she has deposited a particular check and subsequently may attempt to redeposit the same check.

When duplicate items are presented for deposit, a financial institution and/or its computer systems may have to perform several additional steps to resolve the issues that may arise, beyond simply identifying a particular item as a duplicate of a previously-deposited item. For example, after accepting a duplicate item and identifying the item as a duplicate, a financial institution may have to notify the customer that the item is a duplicate of a previously-deposited item, update account balance information to remove any credited funds associated with the item, and/or take other actions. These actions and/or others may be inconvenient for customers of the financial institution and inefficient for the financial institution and its computer systems.

SUMMARY

Aspects of the disclosure relate to various systems and techniques that provide effective, efficient, scalable, and convenient ways of identifying and handling duplicate deposit items, particularly in ways that involve detecting duplicate deposit items at a point of capture.

For example, some aspects of the disclosure provide ways of identifying duplicate deposit items at the point of capture, which may be the place and time at which a deposit item is initially presented to the financial institution for deposit. By identifying duplicate deposit items at the point of capture in accordance with one or more aspects of the disclosure, a financial institution and its computer systems may be able to prevent many, if not all, duplicate deposit items from being accepted for deposit by the financial institution, rather than allowing such items to be accepted for deposit and subsequently identified as duplicates during one or more downstream review processes. Advantageously, by detecting duplicate deposit items at the point of capture in accordance with one or more aspects of the disclosure, a financial institution and its computer systems may be able to more efficiently handle duplicate deposit items. In particular, a reduced amount of manual downstream review of potential duplicates might be needed, for example, and the need for other resolution actions might be reduced, thereby reducing the workload imposed on the financial institution and/or its computer systems that process deposit items. In addition, by detecting duplicate deposit items at the point of capture in accordance with one or more aspects of the disclosure, a financial institution and its computer systems may be able to provide customers of the financial institution with more convenient and efficient user experiences. For example, if a customer presents a duplicate item for deposit, such an item may be rejected outright rather than being accepted for deposit and only to be subsequently rejected after a manual review process has been completed downstream and an amount of time has passed since the item was initially accepted.

As illustrated in greater detail below, when identifying deposit items as duplicates at the point of capture, it may be important to ensure that items which are rejected for deposit as duplicates are very likely to be duplicates. In other words, a relatively high degree of confidence may be required to decision duplicates at the point of capture. Otherwise, customers of a financial institution may grow frustrated with the financial institution if they present legitimate, non-duplicate items for deposit and such items are erroneously rejected as duplicates. Accordingly, and as illustrated in greater detail below, one or more aspects of the disclosure advantageously utilize multiple different types of information in evaluating whether a particular deposit item is a duplicate of a previously-deposited item. In particular, in addition to evaluating magnetic ink character recognition (MICR) information of a deposit item to determine whether the item is a duplicate of a previously-deposited item, a financial institution and its computer systems may utilize image data lift to extract additional information from the deposit item for use in the evaluation. In particular, image data lift may be used to extract information (e.g., other than the MICR information) from the face of the check or the deposit item, such as a name of the payor of the deposit item, an address of the payor, a memo on the face of the deposit item, a signature on the face of the deposit item, and/or the like. Any and/or all of this extracted information subsequently may be used in combination with the MICR information to determine whether a particular deposit item is a duplicate of a previously-deposited item. As a result, duplicate detection may be performed at the point of capture by various computer systems of a financial institution with a relatively high level of accuracy and reliability.

As illustrated in greater detail below, these features and/or others may provide more effective, efficient, scalable, and convenient ways for a financial institution and its computer systems to detect duplicate deposit items at the point of capture and prevent such duplicate items from being accepted for deposit.

In accordance with one or more embodiments, an item processing computing platform having at least one processor, a memory, and a communication interface may receive, via the communication interface, and from a computing device, image data of a deposit item captured by the computing device. Subsequently, the item processing computing platform may read a magnetic ink character recognition (MICR) line of the deposit item to obtain MICR information for the deposit item from the MICR line of the deposit item. Then, the item processing computing platform may perform an image data lift on the image data of the deposit item to extract information from one or more visible fields of the deposit item. Next, the item processing computing platform may compare the MICR information for the deposit item and the information extracted from the one or more visible fields of the deposit item with item history information obtained from an item history database to determine a confidence score indicative of whether the deposit item is a duplicate of a previously-deposited item. If the confidence score is less than a first threshold, the item processing computing platform may reject the deposit item. Alternatively, if the confidence score is not less than the first threshold, the item processing computing platform may accept the deposit item for deposit.

In some embodiments, if the confidence score is less than a second threshold, the item processing computing platform may apply a hold to the deposit item after accepting the deposit item for deposit. Alternatively, if the confidence score is not less than the second threshold, the item processing computing platform may apply a provisional credit to at least one account based on the deposit item after accepting the deposit item for deposit. In addition, the second threshold may be greater than the first threshold.

In some embodiments, the computing device may be an automated teller machine (ATM) operated by a financial institution operating the item processing computing platform. In some instances, after rejecting the deposit item, the item processing computing platform may cause the ATM to present a notification that includes information indicating that the deposit item has been rejected for deposit based on the deposit item resembling a previously-deposited item. In other instances, after accepting the deposit item for deposit, the item processing computing platform may cause the ATM to present a notification that includes information indicating that the deposit item has been accepted for deposit.

In some embodiments, the computing device may be a mobile computing device that includes a mobile banking application configured to be used by a customer of a financial institution operating the item processing computing platform. In some instances, after rejecting the deposit item, the item processing computing platform may cause the mobile computing device to present a notification that includes information indicating that the deposit item has been rejected for deposit based on the deposit item resembling a previously-deposited item. In other instances, after accepting the deposit item for deposit, the item processing computing platform may cause the mobile computing device to present a notification that includes information indicating that the deposit item has been accepted for deposit.

In some embodiments, the computing device may be a teller terminal device configured to be used by a bank teller in a banking center of a financial institution operating the item processing computing platform. In some instances, after rejecting the deposit item, the item processing computing platform may cause the teller terminal device to present a notification that includes information indicating that the deposit item has been rejected for deposit based on the deposit item resembling a previously-deposited item. In other instances, after accepting the deposit item for deposit, the item processing computing platform may cause the teller terminal device to present a notification that includes information indicating that the deposit item has been accepted for deposit.

In some embodiments, after accepting the deposit item for deposit, the item processing computing platform may add new item history information for the deposit item to the item history database based on the MICR information for the deposit item obtained from the MICR line of the deposit item and based on the information extracted from the one or more visible fields of the deposit item.

In some embodiments, the MICR information for the deposit item obtained from the MICR line of the deposit item may include one or more of a routing number, an account number, a serial number, and an amount. Additionally or alternatively, the information extracted from the one or more visible fields of the deposit item may include one or more of a date associated with the deposit item, a name of a payor associated with the deposit item, an address of the payor associated with the deposit item, a memo associated with the deposit item, and a signature associated with the deposit item.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
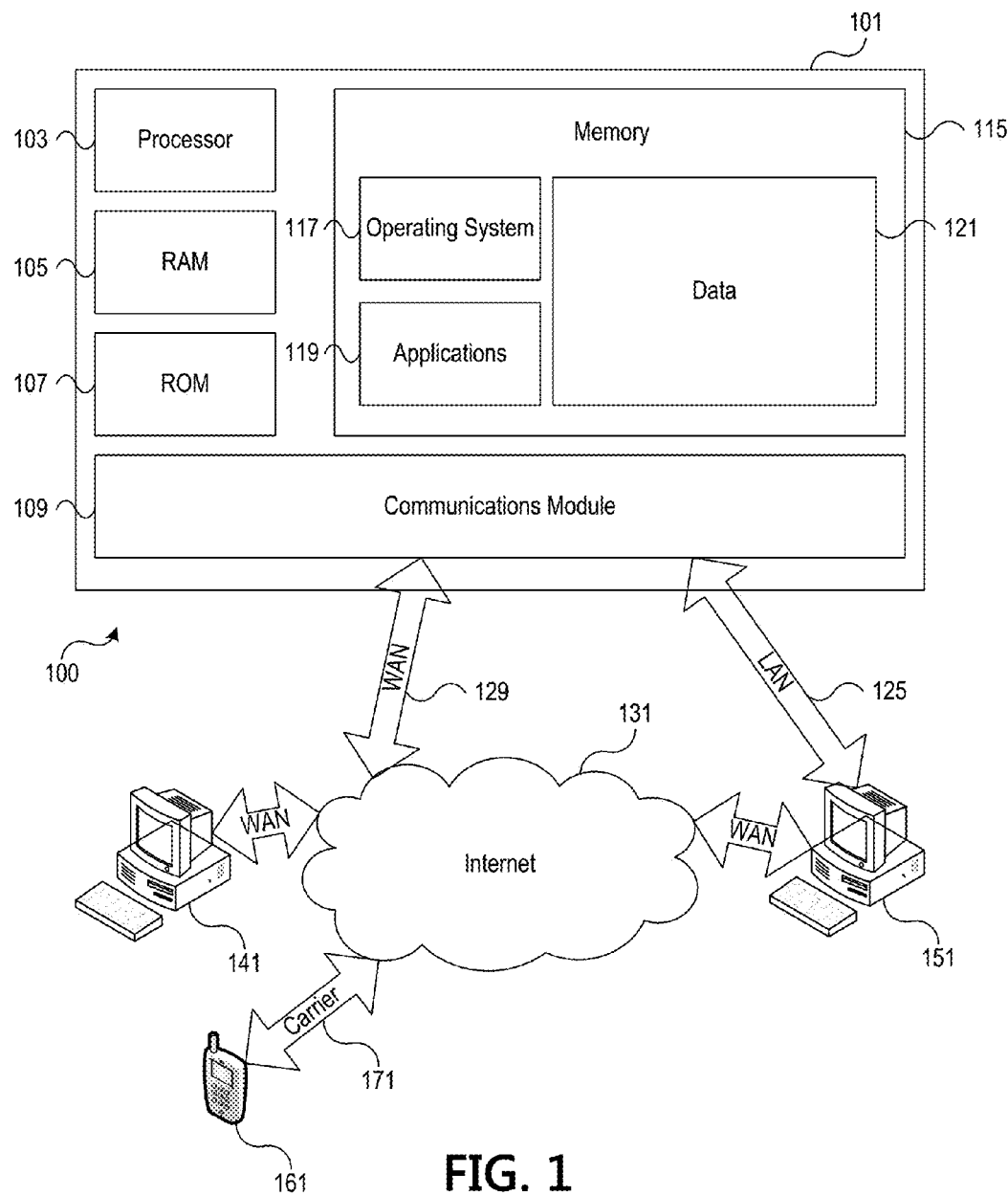
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
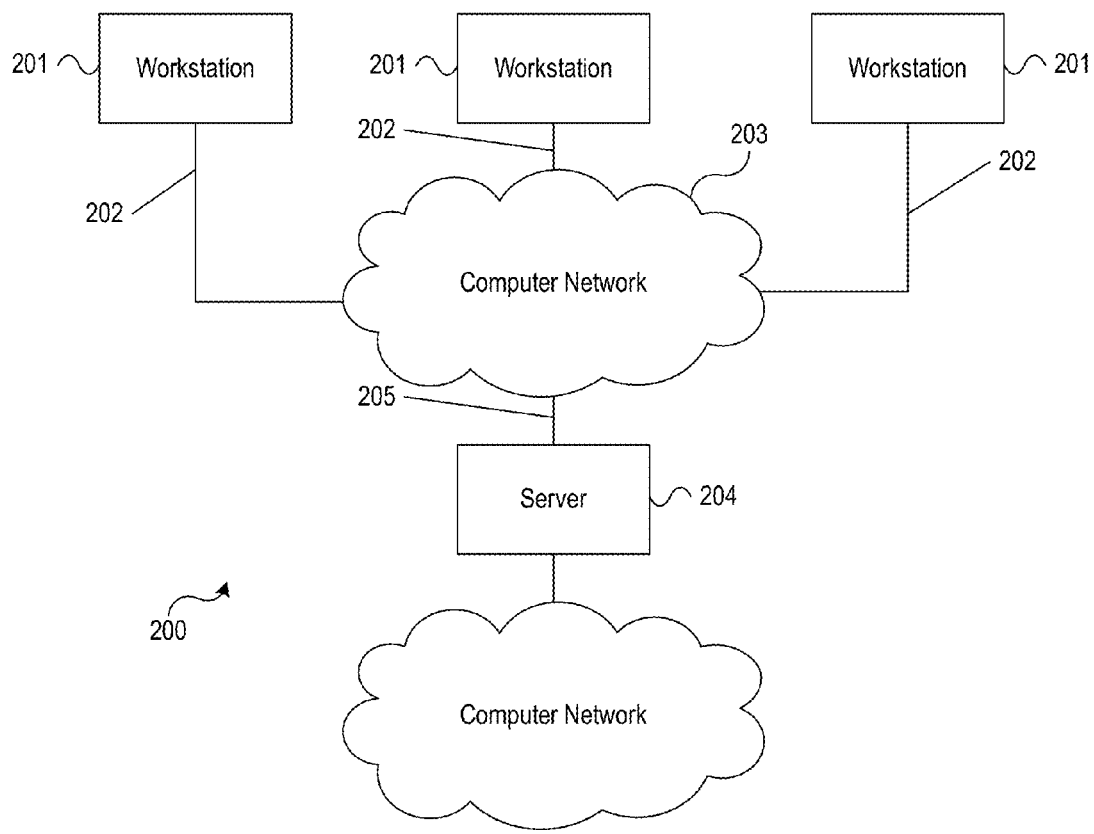
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
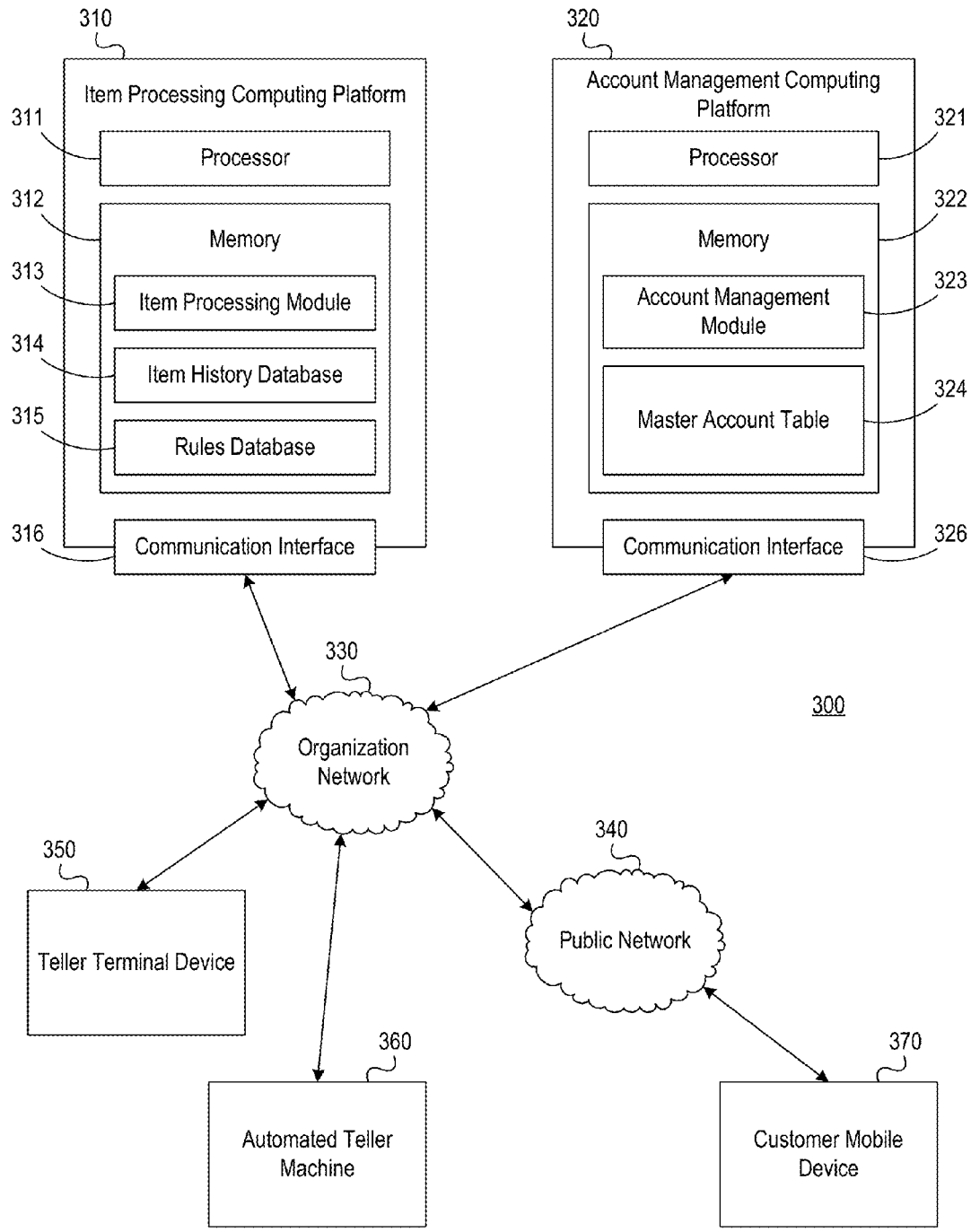
FIG. 3 depicts an illustrative computing environment for detecting duplicate deposit items at a point of capture in accordance with one or more example embodiments.

FIG. 3 depicts an illustrative computing environment for detecting duplicate deposit items at a point of capture in accordance with one or more example embodiments. Referring to FIG. 3, computing environment 300 may include one or more computing devices. For example, computing environment 300 may include a teller terminal device 350, an automated teller machine 360, and a customer mobile device 370. Teller terminal device 350 may, for example, be configured to be used by an employee, associate, or affiliate of an organization that may process deposit items for one or more customers using one or more of the computer systems and/or other elements included in computing environment 300. For example, in some instances, teller terminal device 350 may be configured to be used by a bank teller of a financial institution that may process deposit items for one or more customers of the financial institution using one or more of the computer systems and/or other elements included in computing environment 300, as illustrated in greater detail below. Automated teller machine 360 may, for example, be an automated teller machine that is configured to dispense funds to customers of an organization (e.g., a financial institution), accept deposit items from customers, allow customers to view account balances, and/or automatically provide other functionalities to customers. For example, in some instances, automated teller machine 360 may be operated by a financial institution that may process deposit items for one or more customers using one or more of the computer systems and/or other elements included in computing environment 300, as illustrated in greater detail below. Customer mobile device 370 may, for example, be a mobile computing device that is used by a customer of an organization, such as a financial institution. In some instances, customer mobile device 370 may include a mobile banking application and/or other mobile banking software (which may, e.g., enable the user of customer mobile device 370 to electronically present one or more deposit items for deposit with the financial institution), and such a mobile banking application and/or other mobile banking software may, for instance, be provided by a financial institution that may process deposit items for one or more customers using one or more of the computer systems and/or other elements included in computing environment 300, as illustrated in greater detail below.

Teller terminal device 350, automated teller machine 360, and customer mobile device 370 may be any type of computing device capable of receiving a user interface, receiving input via the user interface, and communicating the received input to one or more other computing devices. For example, teller terminal device 350, automated teller machine 360, and customer mobile device 370 may be a server computer, a desktop computer, laptop computer, tablet computer, smart phone, or the like. As noted above, and as illustrated in greater detail below, any and/or all of teller terminal device 350, automated teller machine 360, and customer mobile device 370 may, in some instances, be special-purpose computing devices configured to perform specific functions.

Computing environment 300 also may include one or more computing platforms. For example, computing environment 300 may include item processing computing platform 310 and account management computing platform 320. Item processing computing platform 310 may include one or more computing devices configured to perform one or more of the functions described herein. For example, item processing computing platform 310 may include one or more computers (e.g., laptop computers, desktop computers, servers, server blades, or the like). Similarly, account management computing platform 320 may include one or more computing devices configured to perform one or more of the functions described herein. For example, account management computing platform 320 may include one or more computers (e.g., laptop computers, desktop computers, servers, server blades, or the like).

Computing environment 300 also may include one or more networks, which may interconnect one or more of teller terminal device 350, automated teller machine 360, customer mobile device 370, item processing computing platform 310, and account management computing platform 320. For example, computing environment 300 may include organization network 330 and public network 340. Organization network 330 and/or public network 340 may include one or more sub-networks (e.g., LANs, WANs, or the like). Organization network 330 may be associated with a particular organization (e.g., a corporation, financial institution, educational institution, governmental institution, or the like) and may interconnect one or more computing devices associated with the organization. For example, teller terminal device 350, automated teller machine 360, item processing computing platform 310, and account management computing platform 320 may be associated with an organization (e.g., a financial institution), and organization network 330 may be associated with and/or operated by the organization, and may include one or more networks (e.g., LANs, WANs, VPNs, or the like) that interconnect teller terminal device 350, automated teller machine 360, item processing computing platform 310, and account management computing platform 320 and one or more other computing devices and/or computer systems that are used by, operated by, and/or otherwise associated with the organization. Public network 340 may connect organization network 330 and/or one or more computing devices connected thereto (e.g., teller terminal device 350, automated teller machine 360, item processing computing platform 310, and account management computing platform 320) with one or more networks and/or computing devices that are not associated with the organization. For example, customer mobile device 370 might not be associated with an organization that operates organization network 330 (e.g., because customer mobile device 370 may be owned and/or operated by a customer of the organization that operates organization network 330, rather than being owned and/or operated by the organization itself or an employee or affiliate of the organization), and public network 340 may include one or more networks (e.g., the internet) that connect customer mobile device 370 to organization network 330 and/or one or more computing devices connected thereto (e.g., teller terminal device 350, automated teller machine 360, item processing computing platform 310, and account management computing platform 320).

Item processing computing platform 310 may include one or more processor(s) 311, memory 312, and communication interface 316. A data bus may interconnect processor(s) 311, memory 312, and/or communication interface 316. Communication interface 316 may be a network interface configured to support communication between item processing computing platform 310 and organization network 330 and/or one or more sub-networks thereof. Memory 312 may include one or more program modules having instructions that when executed by processor(s) 311 cause item processing computing platform 310 to perform one or more functions described herein and/or one or more databases that may store and/or otherwise maintain information which may be used by such program modules and/or processor(s) 311. For example, memory 312 may include item processing module 313, which may include instructions that when executed by processor(s) 311 cause item processing computing platform 310 to perform one or more functions described herein, such as instructions for detecting duplicate deposit items at a point of capture, as illustrated in greater detail below. In addition, memory 312 may include an item history database 314 and a rules database 315. Item history database 314 may store and/or maintain information about one or more deposit items that have been previously deposited using and/or otherwise processed by item processing computing platform 310 and/or an organization (e.g., a financial institution) operating item processing computing platform 310. Rules database 315 may store and/or maintain information defining one or more processing rules that may be used by item processing computing platform 310 in processing one or more deposit items, such as one or more processing rules defining circumstances in which provisional credit may be applied to a financial account when processing a particular deposit item for deposit.

Account management computing platform 320 may include one or more processor(s) 321, memory 322, and communication interface 326. A data bus may interconnect processor(s) 321, memory 322, and/or communication interface 326. Communication interface 326 may be a network interface configured to support communication between account management computing platform 320 and organization network 330 and/or one or more sub-networks thereof. Memory 322 may include one or more program modules having instructions that when executed by processor(s) 321 cause account management computing platform 320 to perform one or more functions described herein and/or one or more data tables that may store and/or otherwise maintain information which may be used by such program modules and/or processor(s) 321. For example, memory 322 may include account management module 323, which may include instructions that when executed by processor(s) 321 cause account management computing platform 320 to perform one or more functions described herein, such as instructions for causing one or more transactions to be performed on one or more financial accounts and/or otherwise executed with respect to one or more financial accounts for which account management computing platform 320 may maintain account information, including account balance information, as illustrated in greater detail below. In addition, memory 322 may include master account table 324. Master account table 324 may store and/or maintain information about one or more financial accounts (e.g., one or more account numbers, one or more account balances, accountholder information, such as name and/or address information, and/or the like) that may be maintained by an organization (e.g., a financial institution) operating account management computing platform 320, and such financial accounts may be maintained by the organization for one or more customers of the organization.

Figure 4A:
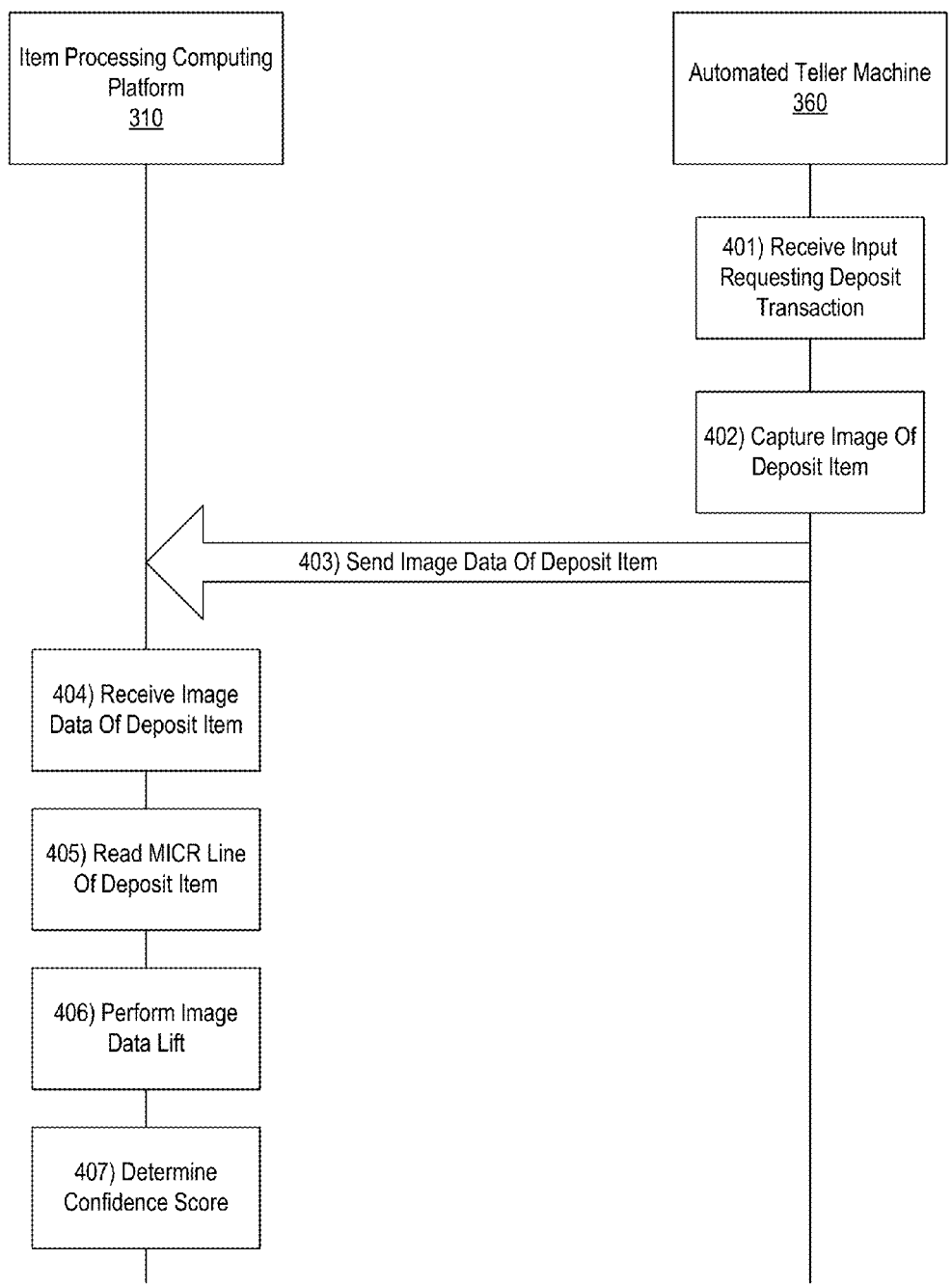
FIGS. 4A-4C depict an illustrative event sequence for detecting duplicate deposit items at a point of capture in accordance with one or more example embodiments.
Figure 4B:
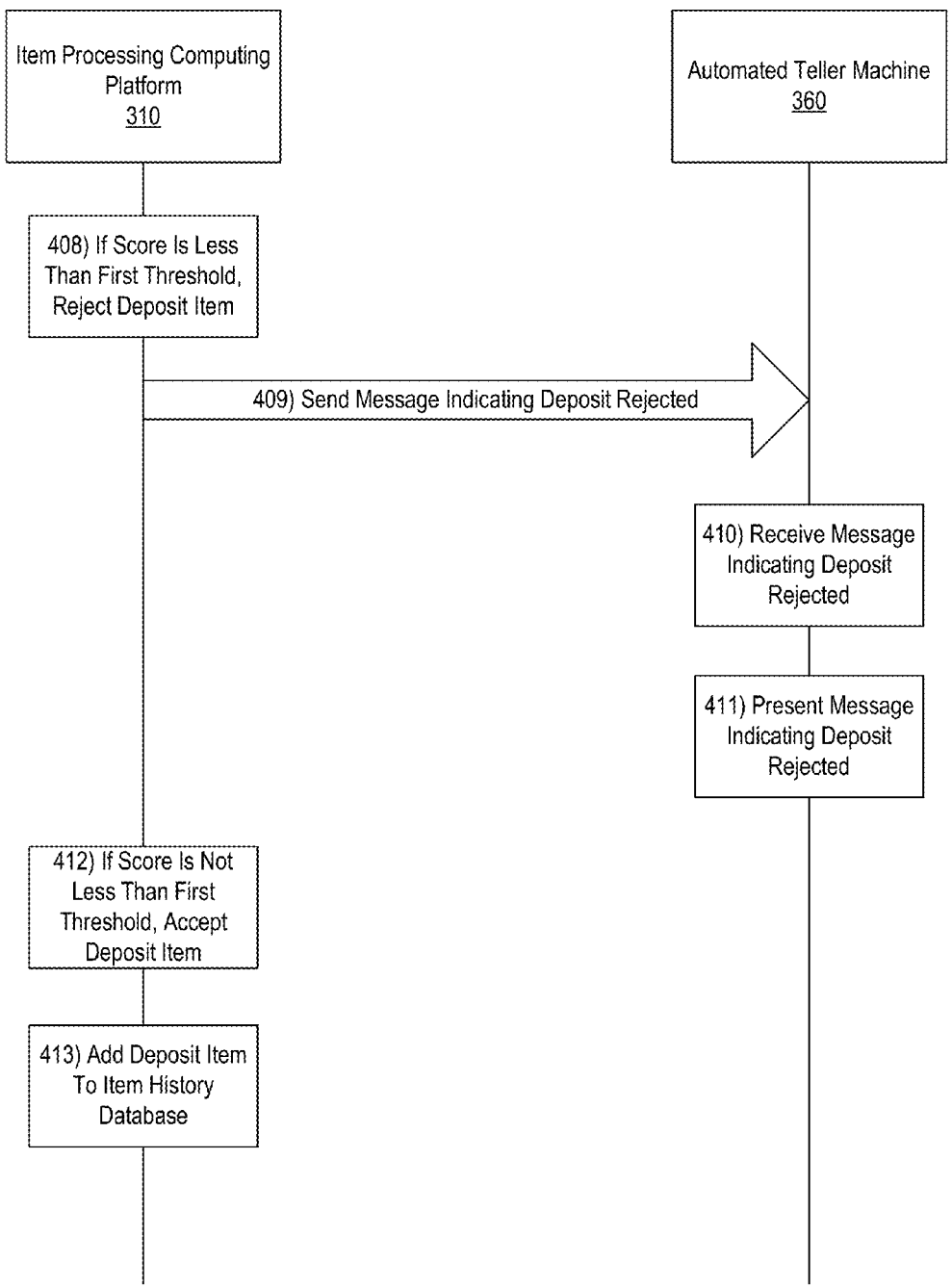
Figure 4C:
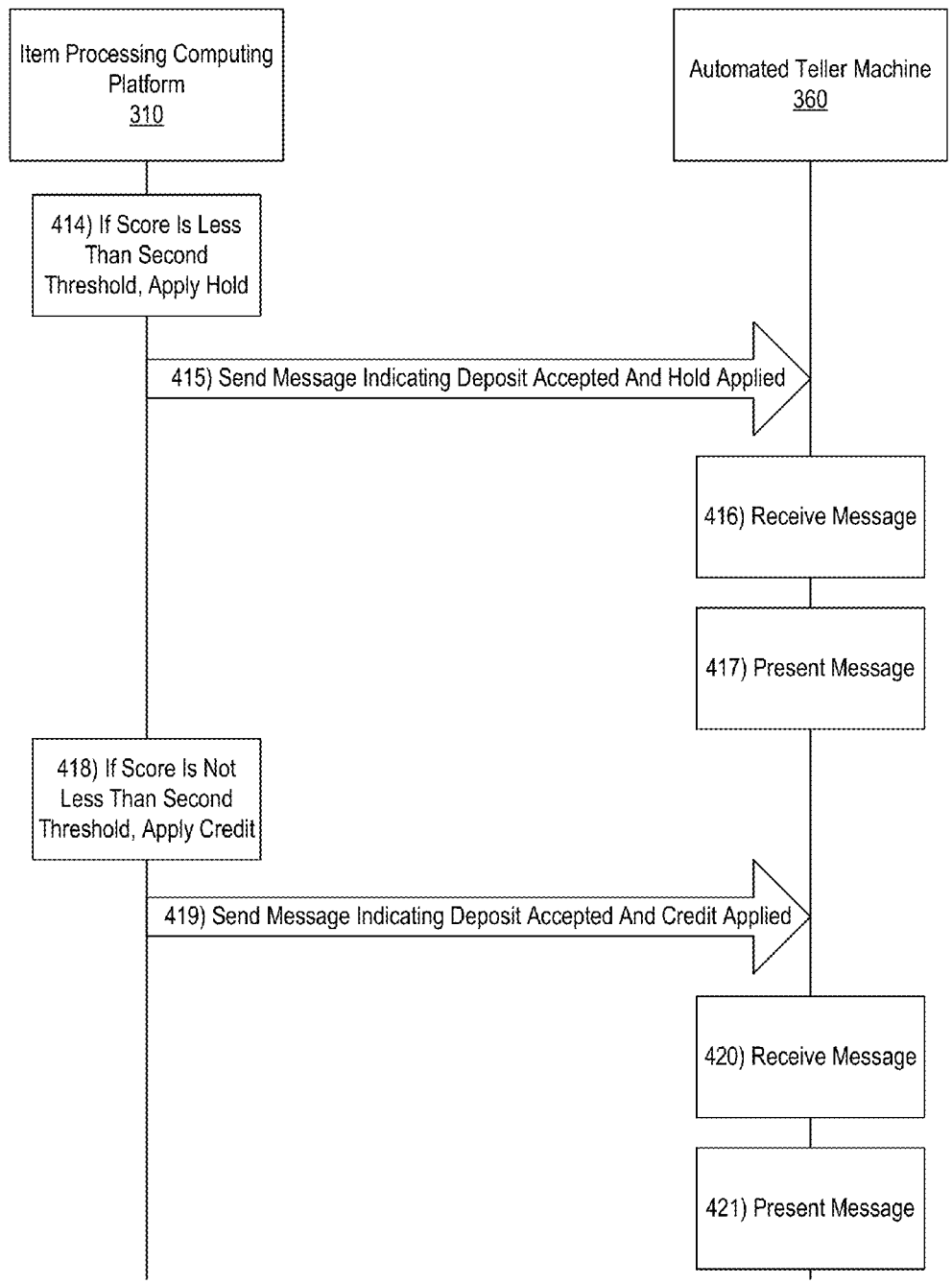

FIGS. 4A-4C depict an illustrative event sequence for detecting duplicate deposit items at a point of capture in accordance with one or more example embodiments. Referring to FIG. 4A, at step 401, automated teller machine 360 may receive input requesting to perform a deposit transaction. For example, at step 401, automated teller machine 360 may receive input from a user of automated teller machine 360 (who may, e.g., be a customer of a financial institution operating automated teller machine 360) via one or more graphical user interfaces presented by automated teller machine 360 (e.g., on a display screen of automated teller machine 360), and such input may command and/or otherwise request automated teller machine 360 to receive a deposit item for deposit and/or otherwise perform a deposit transaction. In some instances, automated teller machine 360 may receive such input after authenticating the user of automated teller machine 360 (e.g., based on a debit card or credit card presented by the user of automated teller machine 360, based on a PIN number entered by the user of automated teller machine 360, based on a one-time passcode entered by the user of automated teller machine 360, and/or based on one or more other credentials provided by the user of automated teller machine 360).

At step 402, automated teller machine 360 may capture an image of a deposit item. For example, at step 402, automated teller machine 360 may capture an image of a deposit item presented for deposit by the user of automated teller machine 360. Automated teller machine 360 may, for instance, capture the image of the deposit item using one or more cameras, scanners, and/or the like that may be included in and/or coupled to automated teller machine 360, which may produce and/or provide image data of the deposit item to one or more processors and/or memory units included in automated teller machine 360. At step 403, automated teller machine 360 may send image data of the deposit item to item processing computing platform 310. For example, at step 403, automated teller machine 360 may send to item processing computing platform 310 the image data of the deposit item captured by automated teller machine 360 at step 402, so as to facilitate processing of the deposit item for deposit (e.g., by the financial institution that may operate automated teller machine 360 and/or item processing computing platform 310), as illustrated in greater detail below.

At step 404, item processing computing platform 310 may receive the image data of the deposit item from automated teller machine 360. For example, at step 404, item processing computing platform 310 may receive, via a communication interface (e.g., communication interface 316), and from a computing device (e.g., automated teller machine 360), image data of a deposit item captured by the computing device (e.g., automated teller machine 360). The image data of the deposit item received by item processing computing platform 310 at step 404 may be received by item processing computing platform 310 when and/or while the deposit item is at a point of capture (which may, e.g., refer to the time and/or the place at which the deposit item is initially presented to a financial institution for deposit) and/or before the deposit item has been accepted for deposit (e.g., by a financial institution operating item processing computing platform 310).

In some embodiments, the computing device (e.g., from which item processing computing platform 310 may receive the image data of the deposit item) may be an automated teller machine (ATM) operated by a financial institution operating the system (e.g., item processing computing platform 310). For instance, item processing computing platform 310 may receive the image data of the deposit item from automated teller machine 360, as illustrated in FIG. 4A. In other embodiments, the computing device (e.g., from which item processing computing platform 310 may receive the image data of the deposit item) may be a mobile computing device comprising a mobile banking application configured to be used by a customer of a financial institution operating the system (e.g., item processing computing platform 310). For instance, item processing computing platform 310 may receive the image data of the deposit item from customer mobile device 370, as discussed in greater detail below (e.g., in connection with the example event sequence illustrated in FIGS. 5A-5C). In other embodiments, the computing device (e.g., from which item processing computing platform 310 may receive the image data of the deposit item) may be a teller terminal device configured to be used by a bank teller in a banking center of a financial institution operating the system (e.g., item processing computing platform 310). For instance, item processing computing platform 310 may receive the image data of the deposit item from teller terminal device 350, as discussed in greater detail below (e.g., in connection with the example event sequence illustrated in FIGS. 6A-6C).

At step 405, item processing computing platform 310 may read the MICR line of the deposit item. For example, at step 405, item processing computing platform 310 may read a magnetic ink character recognition (MICR) line of the deposit item to obtain MICR information for the deposit item from the MICR line of the deposit item. The MICR line of the deposit item may, for instance, include a string of characters that includes a routing number (which may, e.g., correspond to a financial institution on which the deposit item is drawn), an account number (which may, e.g., identify an account of the payor of the deposit item), a serial number (which may, e.g., uniquely identify the deposit item), and an amount (which may, e.g., identify the monetary value of the deposit item). In some embodiments, the MICR information for the deposit item obtained from the MICR line of the deposit item (e.g., by item processing computing platform 310) may thus include one or more of a routing number, an account number, a serial number, and/or an amount. For example, item processing computing platform 310 may obtain any and/or all of this MICR information from the deposit item using optical character recognition and/or other techniques to read the string of characters included in the MICR line of the deposit item.

At step 406, item processing computing platform 310 may perform an image data lift on the image data of the deposit item. For example, at step 406, item processing computing platform 310 may perform an image data lift on the image data of the deposit item to extract information from one or more visible fields of the deposit item. In performing the image data lift on the image data of the deposit item, item processing computing platform 310 may reprocess the image data into text data and/or other non-image data. For example, numbers, letters, and/or the like on the deposit item may be captured in the image data but read and/or stored by item processing computing platform 310 as text data. In processing the image data in this way, item processing computing platform 310 may utilize optical character recognition (OCR) techniques in some instances. In addition, in reprocessing image data into text data, item processing computing platform 310 may, in some instances, reprocess both typewritten information on the face of the deposit item (which may, e.g., include a payor name, payor address, and/or other information printed on the face of the deposit item) and handwritten information on the face of the deposit item (which may, e.g., include a date, memo line content, signature line content, and/or other handwritten information included on the face of the deposit item).

In some embodiments, the information extracted from the one or more visible fields of the deposit item may include one or more of a date associated with the deposit item, a name of a payor associated with the deposit item, an address of the payor associated with the deposit item, a memo associated with the deposit item, and/or a signature associated with the deposit item. For example, the information extracted from the one or more visible fields of the deposit item (e.g., by item processing computing platform 310 in performing the image data lift on the image data of the deposit item) may include one or more of a date associated with the deposit item (which may, e.g., be handwritten on the face of the deposit item), a name of a payor associated with the deposit item (which may, e.g., be printed on the face of the deposit item), an address of the payor associated with the deposit item (which may, e.g., be printed on the face of the deposit item), a memo associated with the deposit item (which may, e.g., be handwritten on the face of the deposit item), and/or a signature associated with the deposit item (which may, e.g., be handwritten on the face of the deposit item).

At step 407, item processing computing platform 310 may determine a confidence score for the deposit item. For example, at step 407, item processing computing platform 310 may compare the MICR information for the deposit item and the information extracted from the one or more visible fields of the deposit item with item history information obtained from an item history database to determine a confidence score indicative of whether the deposit item is a duplicate of a previously-deposited item. For instance, to facilitate this comparison, item processing computing platform 310 may load item history information from item history database 314, and such item history information may include information about various items that have been previously deposited with and/or otherwise processed by the financial institution operating item processing computing platform 310. For example, for each previously-deposited item, item history database 314 may include a record that includes one or more pieces of MICR information for the particular item (e.g., a routing number of the item, an account number of the item, a serial number of the item, and/or an amount of the item) and one or more pieces of extracted information for the particular item (e.g., a date of the deposit item, a name of a payor of the deposit item, an address of the payor of the deposit item, a memo of the deposit item, and/or a signature of the deposit item). Each piece of information (e.g., each piece of MICR information and each piece of extracted information) may be an individual data element that may be used by item processing computing platform 310 in determining a confidence score when comparing a record for a previously-deposited item to information corresponding to an item being presented for deposit at the computing device (e.g., automated teller machine 360, customer mobile device 370, teller terminal device 350) at a point of capture.

For example, in determining the confidence score (e.g., at step 407), item processing computing platform 310 may calculate the confidence score by comparing the deposit item being presented for deposit (e.g., the deposit item for which image data is received at step 404) with a particular previously-deposited item for which a record exists in the item history database. In particular, item processing computing platform 310 may calculate the confidence score by dividing the number of data elements of the deposit item that match data elements of the previously-deposited item by the total number of data elements being compared. The result of this division then may be subtracted from 1 to obtain a score, which in turn may be expressed as a percentage, such that a confidence score of 0% may indicate that all of the data elements analyzed for the deposit item match corresponding data elements of the previously-deposited item, while a confidence score of 100% may indicate that none of the data elements analyzed for the deposit item match corresponding data elements of the previously-deposited item. For example, if the data elements being compared include routing number, account number, serial number, and amount (which may, e.g., all be obtained from MICR information) and date, payor name, payor address, memo, and signature (which may, e.g., all be extracted using image data lift), then the total number of data elements being compared would be nine. In calculating the score in this example, item processing computing platform 310 would then divide the number of corresponding data elements that match (which may, e.g., be zero if none of the data elements of the deposit item match corresponding data elements of the previously deposited item; or which may, e.g., be nine if all of the data elements of the deposit item match corresponding data elements of the previously deposited item) by the total number of data elements being compared (which would, e.g., be nine in this example) to obtain a fractional amount, and item processing computing platform 310 would then subtract this fractional amount from 1 to obtain the confidence score (which item processing computing platform 310 may, e.g., express as a percentage between 0% and 100%).

While the example above contemplates calculating the confidence score by comparing the deposit item to a single previously-deposited item, the confidence score may, in some instances, be calculated based on a comparison of the deposit item to multiple different previously-deposited items (e.g., for which records may exist in the item history database, such as item history database 314). For example, in some instances, in determining the confidence score (e.g., at step 407), item processing computing platform 310 may first perform a primary check to identify any previously-deposited items that have the same MICR information as the deposit item being presented for deposit (e.g., for which image data is received at step 404). Then, if any previously-deposited items do have the same MICR information as the deposit item being presented for deposit, item processing computing platform 310 may perform a secondary check with respect to each previously-deposited item having the same MICR information as the deposit item being presented for deposit, and in this secondary check, item processing computing platform 310 may determine if the information extracted from the visible fields of the deposit item being presented for deposit matches corresponding information of each previously-deposited item. To the extent that information extracted from the visible fields of the deposit item being presented for deposit matches corresponding information of each previously-deposited item, item processing computing platform 310 may decrement the confidence score, for example.

In some instances, when calculating the confidence score (e.g., at step 407), item processing computing platform 310 may assign different weights to different data elements, such that different data elements have a relatively larger or smaller influence on the confidence score than other data elements. For example, item processing computing platform 310 may assign a relatively larger weight to date information (which may, e.g., be extracted via image data lift) and relatively smaller weights to payor name information and payor address information, as date information would most likely vary between different deposit items which might have similar MICR information because they are associated with the same payor (and thus, e.g., date information may be more indicative of whether a particular deposit item is a duplicate of a previously-deposited item), whereas payor name information and payor address information would likely be the same and thus would likely be determined to match for such items.

Referring to FIG. 4B, if the confidence score is less than the first threshold (e.g., at step 407), then at step 408, item processing computing platform 310 may reject the deposit item. For example, at step 408, item processing computing platform 310 may reject the deposit item while the deposit item is still at the point of capture (e.g., at a time and place at which the deposit item is presented for deposit) and before the financial institution operating item processing computing platform 310 accepts the deposit item (e.g., so as to prevent the deposit item from making its way downstream into various check processing and clearing channels). As an example, the first threshold may be 50%, such that if the confidence score is less than 50% (e.g., indicating that the deposit item is more likely than not a duplicate), the deposit item may be rejected at the point of capture before the financial institution operating item processing computing platform 310 accepts the deposit item.

Figure 7:
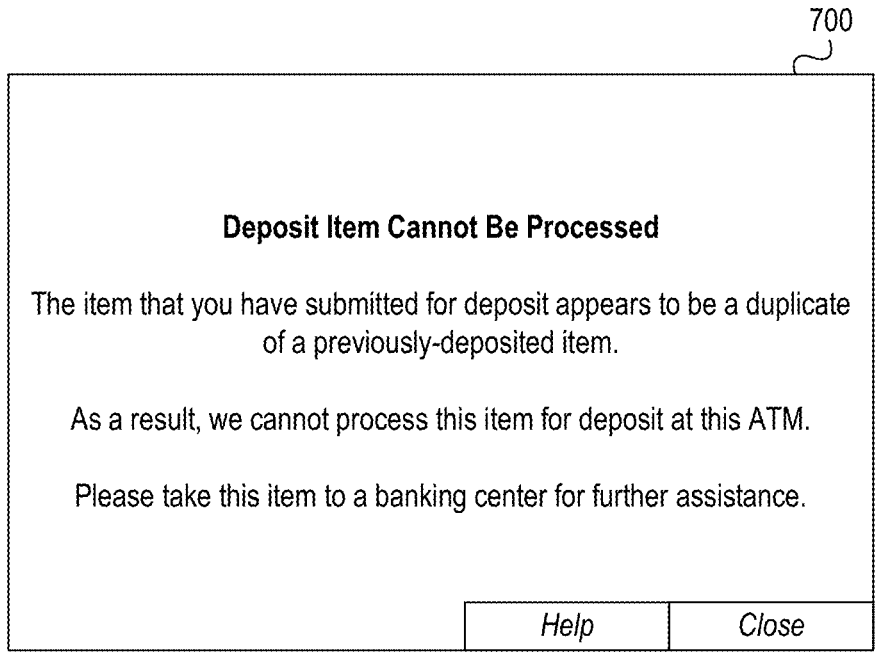
FIGS. 7-15 depict example graphical user interfaces for detecting duplicate deposit items at a point of capture in accordance with one or more example embodiments.

After rejecting the deposit item (e.g., at step 408), item processing computing platform 310 may, at step 409, send to automated teller machine 360 a message indicating that the deposit item has been rejected. For example, after rejecting the deposit item, item processing computing platform 310 may send such a message to cause automated teller machine 360 to present a notification that includes information indicating that the deposit item has been rejected for deposit based on the deposit item resembling a previously-deposited item. For instance, item processing computing platform 310 may cause automated teller machine 360 to present a graphical user interface that includes such information, similar to the graphical user interface discussed in greater detail below in connection with FIG. 7. At step 410, automated teller machine 360 may receive the message indicating that the deposit item has been rejected. At step 411, automated teller machine 360 may present the message indicating that the deposit item has been rejected. For example, in presenting the message indicating that the deposit item has been rejected, automated teller machine 360 may display, cause to be displayed, and/or otherwise present a graphical user interface similar to graphical user interface 700, which is illustrated in FIG. 7. As seen in FIG. 7, graphical user interface 700 may include text and/or information notifying the user of automated teller machine 360 that the deposit item cannot be processed for deposit at automated teller machine 360 and/or requesting that the user of automated teller machine 360 visit a banking center for further assistance with depositing the deposit item.

Alternatively, if the confidence score is not less than the first threshold (e.g., at step 407, then at step 412, item processing computing platform 310 may accept the deposit item for deposit. For example, at step 412, item processing computing platform 310 may accept the deposit item for deposit after determining, at the point of capture, that the deposit item is likely not a duplicate of a previously-deposited item. After accepting the deposit item for deposit, item processing computing platform 310 may process the deposit item for deposit in accordance with various procedures that may be implemented by the financial institution operating item processing computing platform 310. For example, item processing computing platform 310 may send transaction information to account management computing platform 320 to cause account management computing platform 320 to update account information for one or more accounts to reflect the deposit and/or any credit and/or debit of funds associated with the deposit. In some instances, even after the deposit item is accepted for deposit (e.g., by item processing computing platform 310 at step 412), the deposit item may still be subject to additional downstream review by the financial institution and/or its computer systems (e.g., so as to performed additional, more detailed, and/or manual duplicate detection analysis), while in other instances, the deposit item might not be subject to any further review.

After accepting the deposit item (e.g., at step 412), item processing computing platform 310 may, at step 413, add the deposit item to an item history database. For example, after accepting the deposit item for deposit, item processing computing platform 310 may add new item history information for the deposit item to the item history database (e.g., item history database 314) based on the MICR information for the deposit item obtained from the MICR line of the deposit item and based on the information extracted from the one or more visible fields of the deposit item. In adding such item history information to the item history database, item processing computing platform 310 may, for instance, create a new record in the item history database for the deposit item, and the new record may include the MICR information for the deposit item obtained from the MICR line of the deposit item (e.g., by item processing computing platform 310) and the information extracted from the one or more visible fields of the deposit item (e.g., by item processing computing platform 310 during the image data lift). By adding such item history information for the deposit item to item history database 314, item processing computing platform 310 may prevent the deposit item from being processed for deposit more than once and/or otherwise in error (e.g., in the future).

Referring to FIG. 4C, after accepting the deposit item, item processing computing platform 310 may, in some embodiments, reevaluate the confidence score for the deposit item to determine whether to apply a hold to the deposit item or, alternatively, whether to apply a provisional credit to one or more accounts for the deposit item. As illustrated below, in reevaluating the confidence score, item processing computing platform 310 may, in some instances, evaluate the confidence score using a second threshold that is different from the first threshold.

For example, if the confidence score is less than a second threshold, then at step 414, item processing computing platform 310 may apply a hold to the deposit item. For instance, the second threshold may be greater than the first threshold (e.g., the second threshold may be 80%, while the first threshold may be 50%), and a hold may be applied by item processing computing platform 310 to prevent access to funds associated with the deposit item until the deposit item can be verified and/or manually examined (e.g., to confirm with a relatively greater degree of certainty that the deposit item is not a duplicate of a previously-deposited item). In this way, item processing computing platform 310 may apply a hold to a deposit item in scenarios in which the confidence score is not low enough to reject the deposit item outright, but also is not high enough to provide a provisional credit for the deposit item to one or more accounts.

Figure 8:
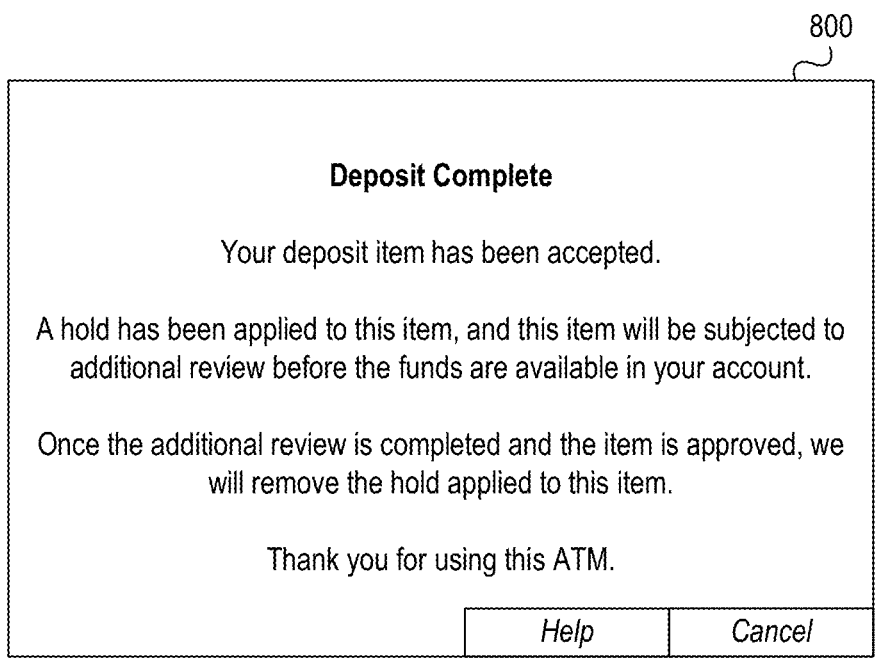

After applying a hold to the deposit item (e.g., at step 414), item processing computing platform 310 may, at step 415, send to automated teller machine 360 a message indicating that the deposit item has been accepted and that a hold has been applied to the deposit item. For example, after accepting the deposit item for deposit, item processing computing platform 310 may send such a message to cause automated teller machine 360 to present a notification that includes information indicating that the deposit item has been accepted for deposit. For instance, item processing computing platform 310 may cause automated teller machine 360 to present a graphical user interface that includes such information, similar to the graphical user interfaces discussed in greater detail below in connection with FIGS. 8 and 9. At step 416, automated teller machine 360 may receive the message indicating that the deposit item has been accepted and that the hold has been applied to the deposit item. At step 417, automated teller machine 360 may present the message indicating that the deposit item has been accepted and that the hold has been applied to the deposit item. For example, in presenting the message indicating that the deposit item has been accepted and that the hold has been applied to the deposit item, automated teller machine 360 may display, cause to be displayed, and/or otherwise present a graphical user interface similar to graphical user interface 800, which is illustrated in FIG. 8. As seen in FIG. 8, graphical user interface 800 may include text and/or information notifying the user of automated teller machine 360 that the deposit item has been accepted by the financial institution, a hold has been applied to the deposit item to facilitate additional review, and once the additional review is completed, the hold will be removed.

Alternatively, if the confidence score is not less than the second threshold, then at step 418, item processing computing platform 310 may apply a provisional credit for the deposit item to one or more accounts. For example, if the confidence score is not less than the second threshold, then at step 418, item processing computing platform 310 may apply a provisional credit to at least one account based on the deposit item, such as one or more accounts that may be specified by the user of automated teller machine 360 and/or otherwise associated with the user of automated teller machine 360. In some instances, in applying a provisional credit to at least one account, item processing computing platform 310 may calculate and/or otherwise determine the amount of provisional credit to be applied based on the confidence score (e.g., the provisional credit may be calculated as a linear proportion of the confidence score, such that a relatively higher confidence score results in a relatively higher provisional credit, whereas a relatively lower confidence score results in a relatively lower provisional credit). In calculating the amount of provisional credit, item processing computing platform 310 may access, load, and/or utilize one or more rules and/or equations for determining the amount of provisional credit to be applied, and such rules and/or equations may be stored and/or otherwise maintained by item processing computing platform 310 in rules database 315. In some instances, item processing computing platform 310 also may store and/or maintain information defining one or more thresholds, such as the first threshold and the second threshold, in rules database 315.

In some instances, in applying a provisional credit for the deposit item, item processing computing platform 310 may send one or more messages to and/or exchange data with account management computing platform 320 so as to cause account management computing platform 320 update account information for the one or more accounts into which the deposit item is being deposited so as to reflect a credit associated with the deposit item. In some instances, in applying a hold to a particular deposit item and/or removing such a hold from a deposit item, item processing computing platform 310 may similarly prevent account management computing platform 320 from applying and/or cause account management computing platform 320 to apply a credit to one or more particular accounts for a particular deposit item based on any additional review that may be performed on the deposit item.

Figure 9:
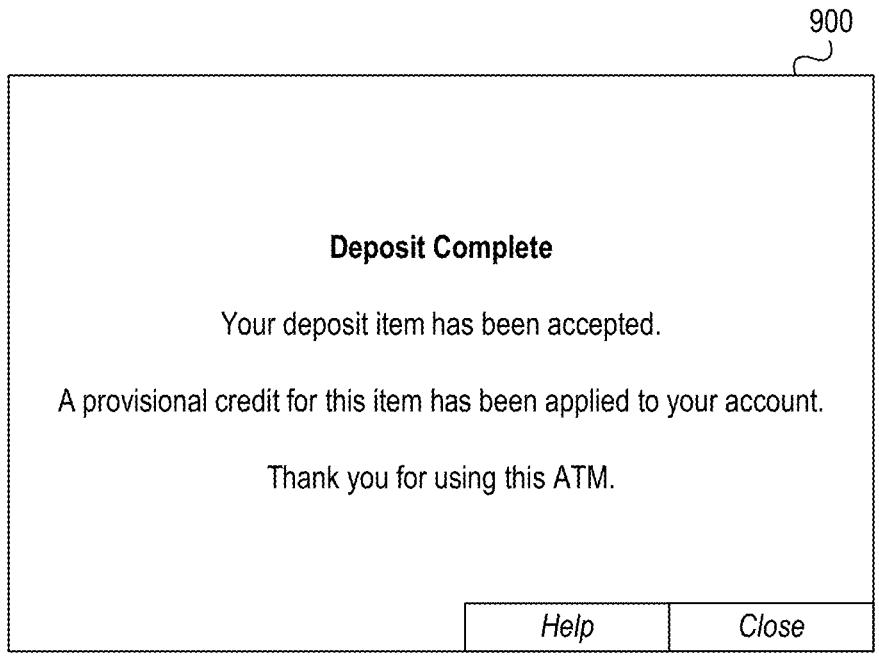

After applying a provisional credit for the deposit item to one or more accounts (e.g., at step 418), item processing computing platform 310 may, at step 419, send to automated teller machine 360 a message indicating that the deposit item has been accepted and that a provisional credit for the deposit item has been applied to one or more accounts. For example, after accepting the deposit item for deposit, item processing computing platform 310 may send such a message to cause automated teller machine 360 to present a notification that includes information indicating that the deposit item has been accepted for deposit. At step 420, automated teller machine 360 may receive the message indicating that the deposit item has been accepted and that the provisional credit for the deposit item has been applied to the one or more accounts. At step 421, automated teller machine 360 may present the message indicating that the deposit item has been accepted and that the provisional credit for the deposit item has been applied to the one or more accounts. For example, in presenting the message indicating that the deposit item has been accepted and that the provisional credit for the deposit item has been applied to the one or more accounts, automated teller machine 360 may display, cause to be displayed, and/or otherwise present a graphical user interface similar to graphical user interface 900, which is illustrated in FIG. 9. As seen in FIG. 9, graphical user interface 900 may include text and/or information notifying the user of automated teller machine 360 that the deposit item has been accepted by the financial institution and that a provisional credit for the deposit item has been applied to the customer's account.

Figure 5A:
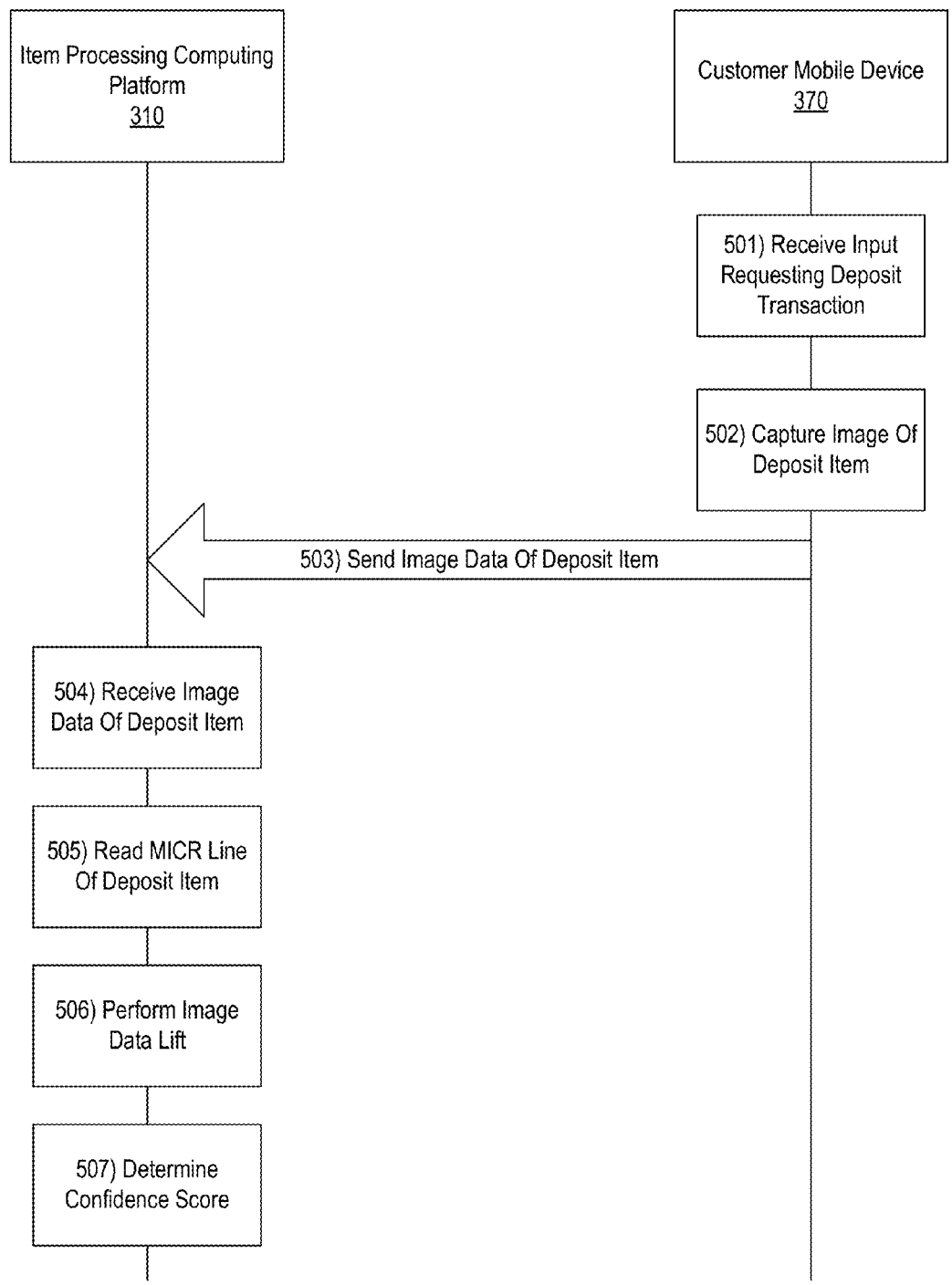
FIGS. 5A-5C depict another illustrative event sequence for detecting duplicate deposit items at a point of capture in accordance with one or more example embodiments.
Figure 5B:
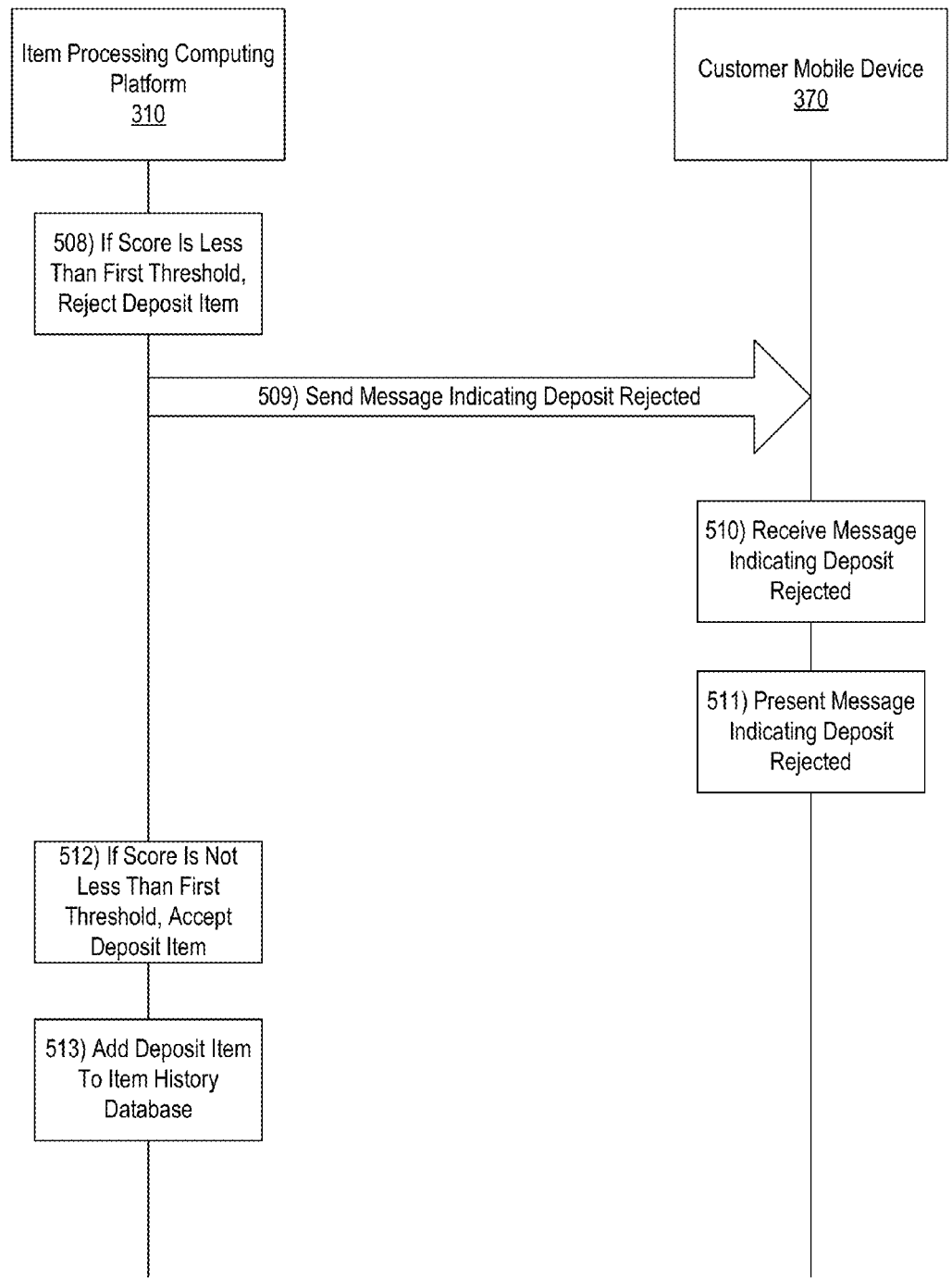
Figure 5C:
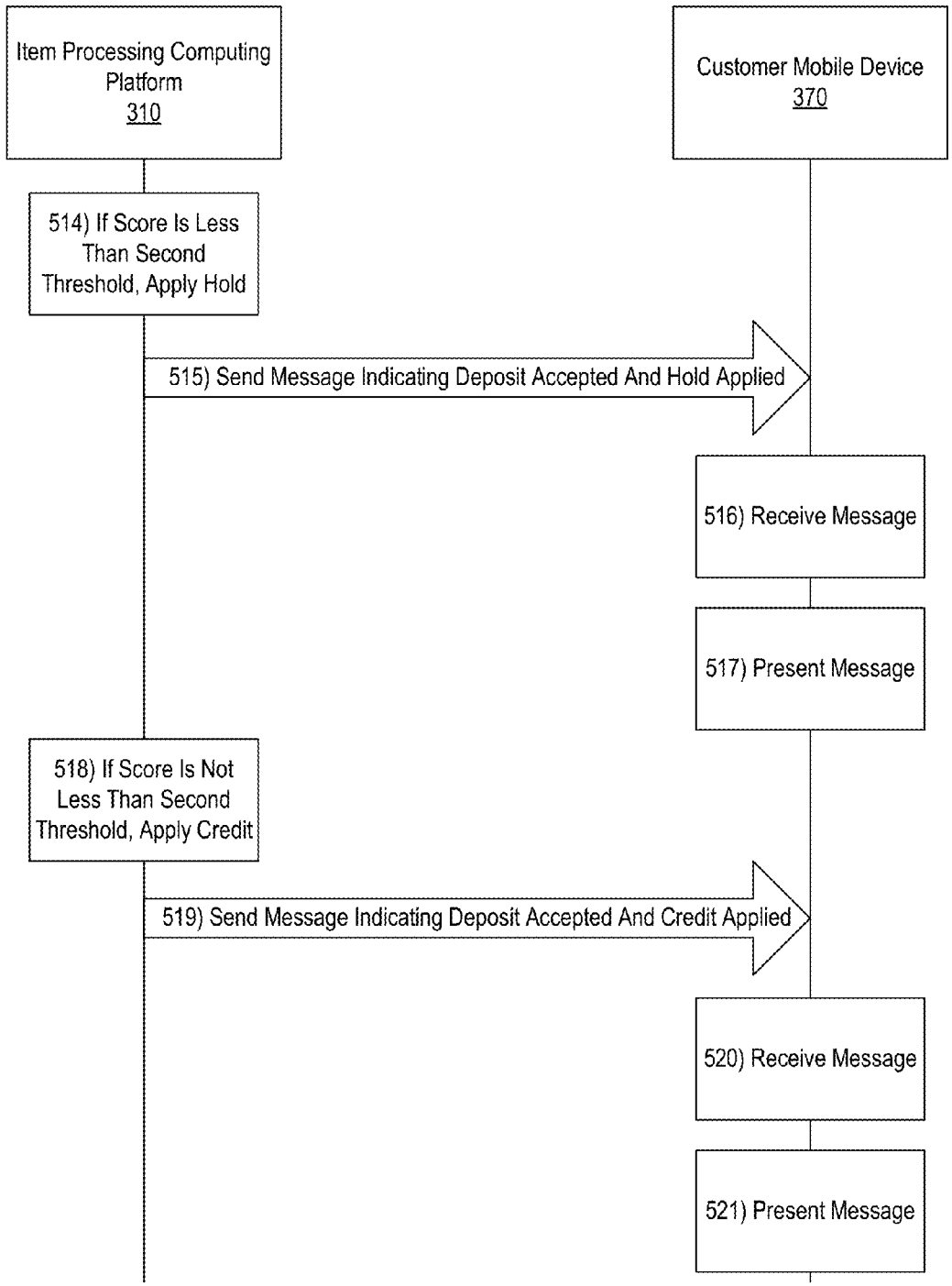

FIGS. 5A-5C depict another illustrative event sequence for detecting duplicate deposit items at a point of capture in accordance with one or more example embodiments. In particular, FIGS. 5A-5C depict an example event sequence illustrating how item processing computing platform 310 may perform duplicate detection on one or more deposit items at the point of capture when customer mobile device 370 is used to capture image data of a deposit item and submit the captured image data to item processing computing platform 310 for processing. As illustrated in greater detail below, customer mobile device 370 may perform several steps in this example event sequence similar to those steps performed by automated teller machine 360 in the example event sequence discussed above with respect to FIGS. 4A-4C.

For example, referring to FIG. 5A, at step 501, customer mobile device 370 may receive input requesting to perform a deposit transaction. In some instances, such input may be received via a mobile banking application on customer mobile device 370 (which may, e.g., present one or more graphical user interfaces on customer mobile device 370 via which such input may be received). At step 502, customer mobile device 370 may capture an image of a deposit item. At step 503, customer mobile device 370 may send image data of the deposit item to item processing computing platform 310.

At step 504, item processing computing platform 310 may receive the image data of the deposit item from customer mobile device 370 (e.g., similar to how item processing computing platform 310 may receive image data of a deposit item at step 404). At step 505, item processing computing platform 310 may read a MICR line of the deposit item to obtain MICR information from the MICR line of the deposit item (e.g., similar to how item processing computing platform 310 may read a MICR line of the deposit item at step 405). At step 506, item processing computing platform 310 may perform an image data lift on the image data of the deposit item to extract information from one or more visible fields of the deposit item (e.g., similar to how item processing computing platform 310 may perform an image data lift at step 406). At step 507, item processing computing platform 310 may determine a confidence score for the deposit item (e.g., similar to how item processing computing platform 310 may determine a confidence score at step 407).

Figure 10:
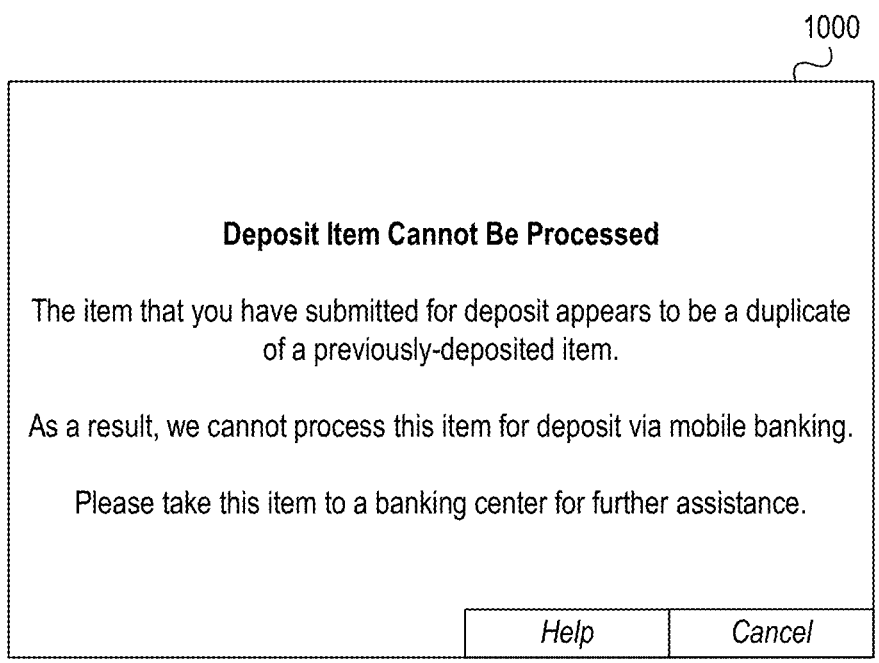

Referring to FIG. 5B, if the confidence score is less than a first threshold, then at step 508, item processing computing platform 310 may reject the deposit item (e.g., similar to how item processing computing platform 310 may reject a deposit item at step 408). After rejecting the deposit item, item processing computing platform 310 may, at step 509, send to customer mobile device 370 a message indicating that the deposit item has been rejected (e.g., similar to how item processing computing platform 310 may send such a message at step 409). For instance, after rejecting the deposit item, item processing computing platform 310 may send such a message to cause customer mobile device 370 to present a notification that includes information indicating that the deposit item has been rejected for deposit based on the deposit item resembling a previously-deposited item. For instance, item processing computing platform 310 may cause customer mobile device 370 to present a graphical user interface that includes such information, similar to the graphical user interface discussed in greater detail below in connection with FIG. 10. At step 510, customer mobile device 370 may receive the message indicating that the deposit item has been rejected. At step 511, customer mobile device 370 may present the message indicating that the deposit item has been rejected. For example, in presenting the message indicating that the deposit item has been rejected, customer mobile device 370 may display, cause to be displayed, and/or otherwise present a graphical user interface similar to graphical user interface 1000, which is illustrated in FIG. 10. As seen in FIG. 10, graphical user interface 1000 may include text and/or information notifying the user of customer mobile device 370 that the deposit item cannot be processed for deposit at customer mobile device 370 and/or requesting that the user of customer mobile device 370 visit a banking center for further assistance with depositing the deposit item.

Alternatively, if the confidence score is not less than the first threshold, then at step 512, item processing computing platform 310 may accept the deposit item for deposit (e.g., similar to how item processing computing platform 310 may accept a deposit item at step 412). After accepting the deposit item for deposit, item processing computing platform 310 may, at step 513, add the deposit item to an item history database (e.g., similar to how item processing computing platform 310 may add a deposit item to an item history database at step 413).

Referring to FIG. 5C, after accepting the deposit item, item processing computing platform 310 may, in some embodiments, reevaluate the confidence score for the deposit item to determine whether to apply a hold to the deposit item or, alternatively, whether to apply a provisional credit to one or more accounts for the deposit item, similar to how item processing computing platform 310 may reevaluate the confidence score for a deposit item in the example event sequence discussed above.

Figure 11:
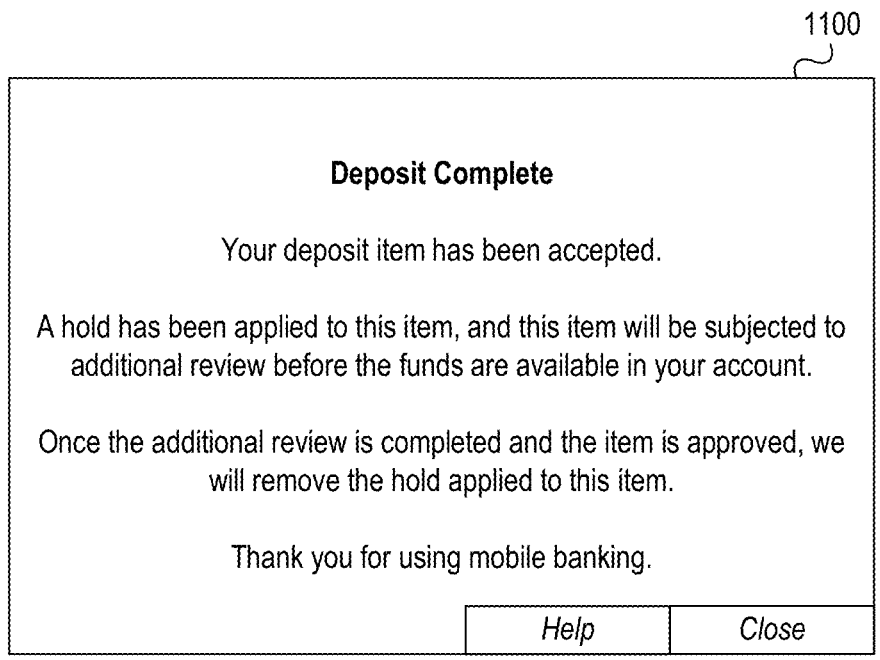

For example, if the confidence score is less than a second threshold, then at step 514, item processing computing platform 310 may apply a hold to the deposit item (e.g., similar to how item processing computing platform 310 may apply a hold to a deposit item at step 414). After applying a hold to the deposit item, item processing computing platform 310 may, at step 515, send to customer mobile device 370 a message indicating that the deposit item has been accepted and that a hold has been applied to the deposit item (e.g., similar to how item processing computing platform 310 may send such a message at step 415). For example, after accepting the deposit item for deposit, item processing computing platform 310 may send such a message to cause customer mobile device 370 to present a notification that includes information indicating that the deposit item has been accepted for deposit. For instance, item processing computing platform 310 may cause customer mobile device 370 to present a graphical user interface that includes such information, similar to the graphical user interfaces discussed in greater detail below in connection with FIGS. 11 and 12. At step 516, customer mobile device 370 may receive the message indicating that the deposit item has been accepted and that the hold has been applied to the deposit item. At step 517, customer mobile device 370 may present the message indicating that the deposit item has been accepted and that the hold has been applied to the deposit item. For example, in presenting the message indicating that the deposit item has been accepted and that the hold has been applied to the deposit item, customer mobile device 370 may display, cause to be displayed, and/or otherwise present a graphical user interface similar to graphical user interface 1100, which is illustrated in FIG. 11. As seen in FIG. 11, graphical user interface 1100 may include text and/or information notifying the user of customer mobile device 370 that the deposit item has been accepted by the financial institution, a hold has been applied to the deposit item to facilitate additional review, and once the additional review is completed, the hold will be removed.

Figure 12:
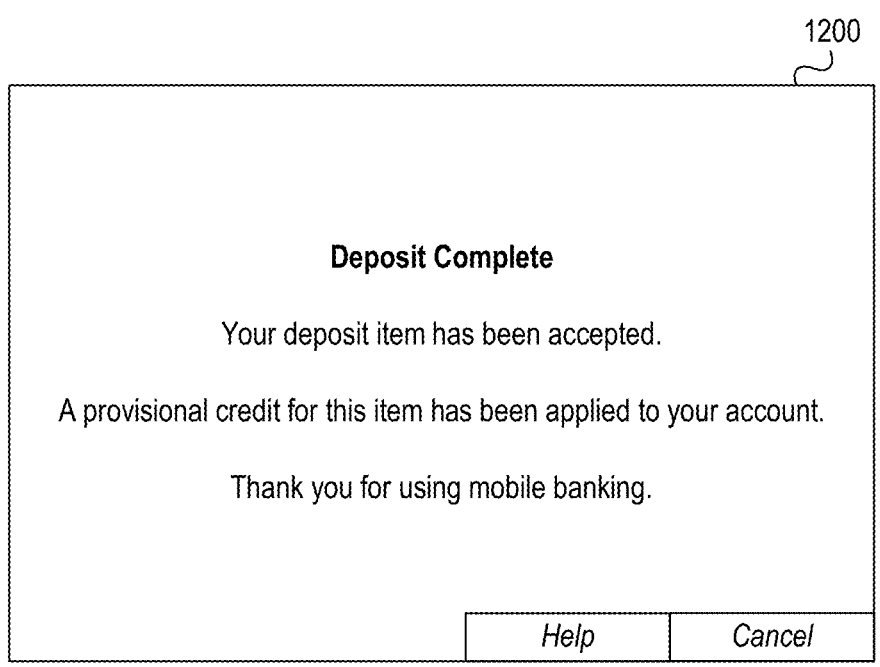

Alternatively, if the confidence score is not less than the second threshold, then at step 518, item processing computing platform 310 may apply a provisional credit for the deposit item to one or more accounts (e.g., similar to how item processing computing platform 310 may apply such a provisional credit at step 418). After applying a provisional credit for the deposit item to one or more accounts, item processing computing platform 310 may, at step 519, send to customer mobile device 370 a message indicating that the deposit item has been accepted and that a provisional credit for the deposit item has been applied to one or more accounts (e.g., similar to how item processing computing platform 310 may send such a message at step 419). For example, after accepting the deposit item for deposit, item processing computing platform 310 may send such a message to cause customer mobile device 370 to present a notification that includes information indicating that the deposit item has been accepted for deposit. At step 520, customer mobile device 370 may receive the message indicating that the deposit item has been accepted and that the provisional credit for the deposit item has been applied to the one or more accounts. At step 521, customer mobile device 370 may present the message indicating that the deposit item has been accepted and that the provisional credit for the deposit item has been applied to the one or more accounts. For example, in presenting the message indicating that the deposit item has been accepted and that the provisional credit for the deposit item has been applied to the one or more accounts, customer mobile device 370 may display, cause to be displayed, and/or otherwise present a graphical user interface similar to graphical user interface 1200, which is illustrated in FIG. 12. As seen in FIG. 12, graphical user interface 1200 may include text and/or information notifying the user of customer mobile device 370 that the deposit item has been accepted by the financial institution and that a provisional credit for the deposit item has been applied to the customer's account.

Figure 6A:
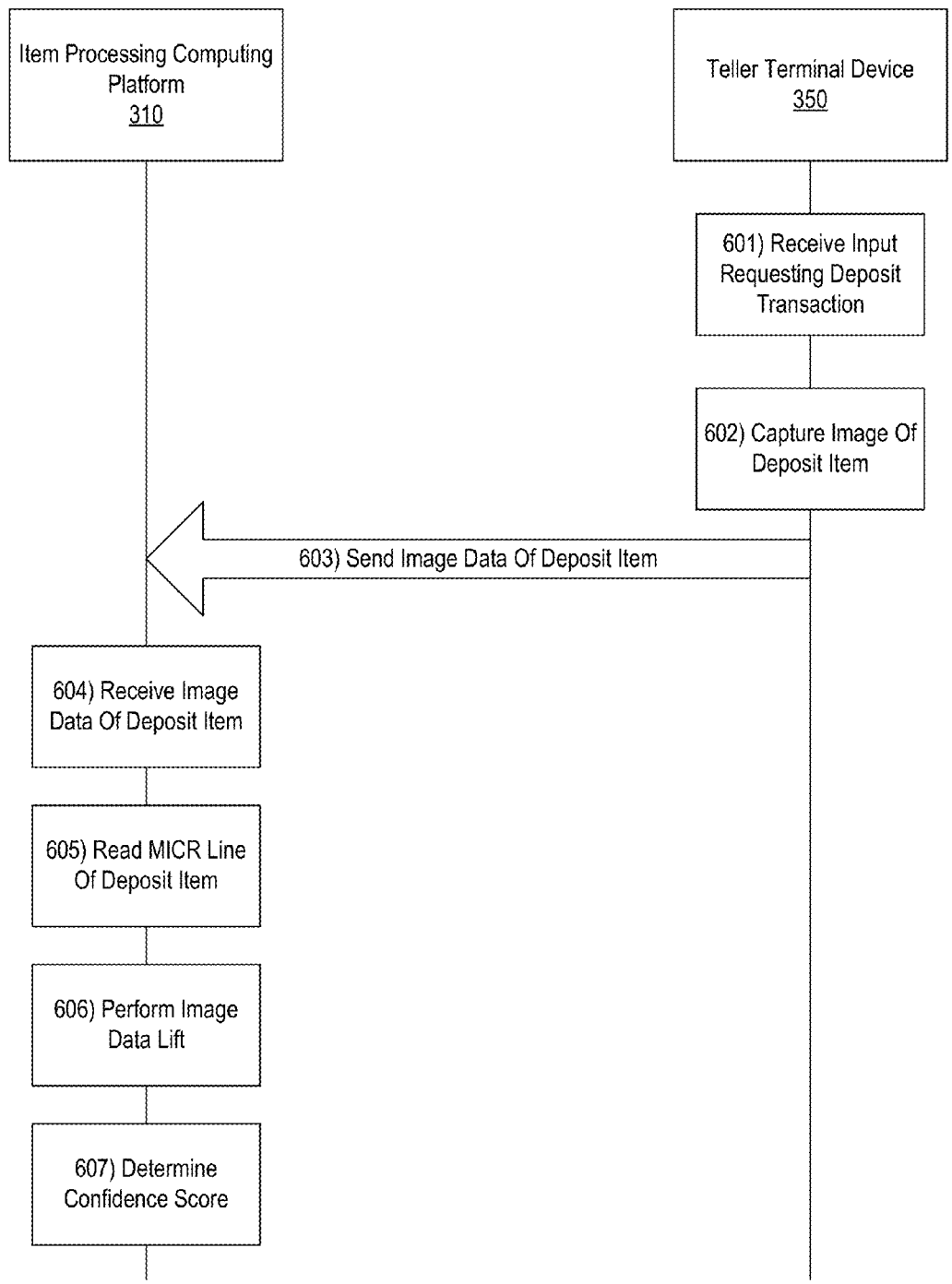
FIGS. 6A-6C depict another illustrative event sequence for detecting duplicate deposit items at a point of capture in accordance with one or more example embodiments.
Figure 6B:
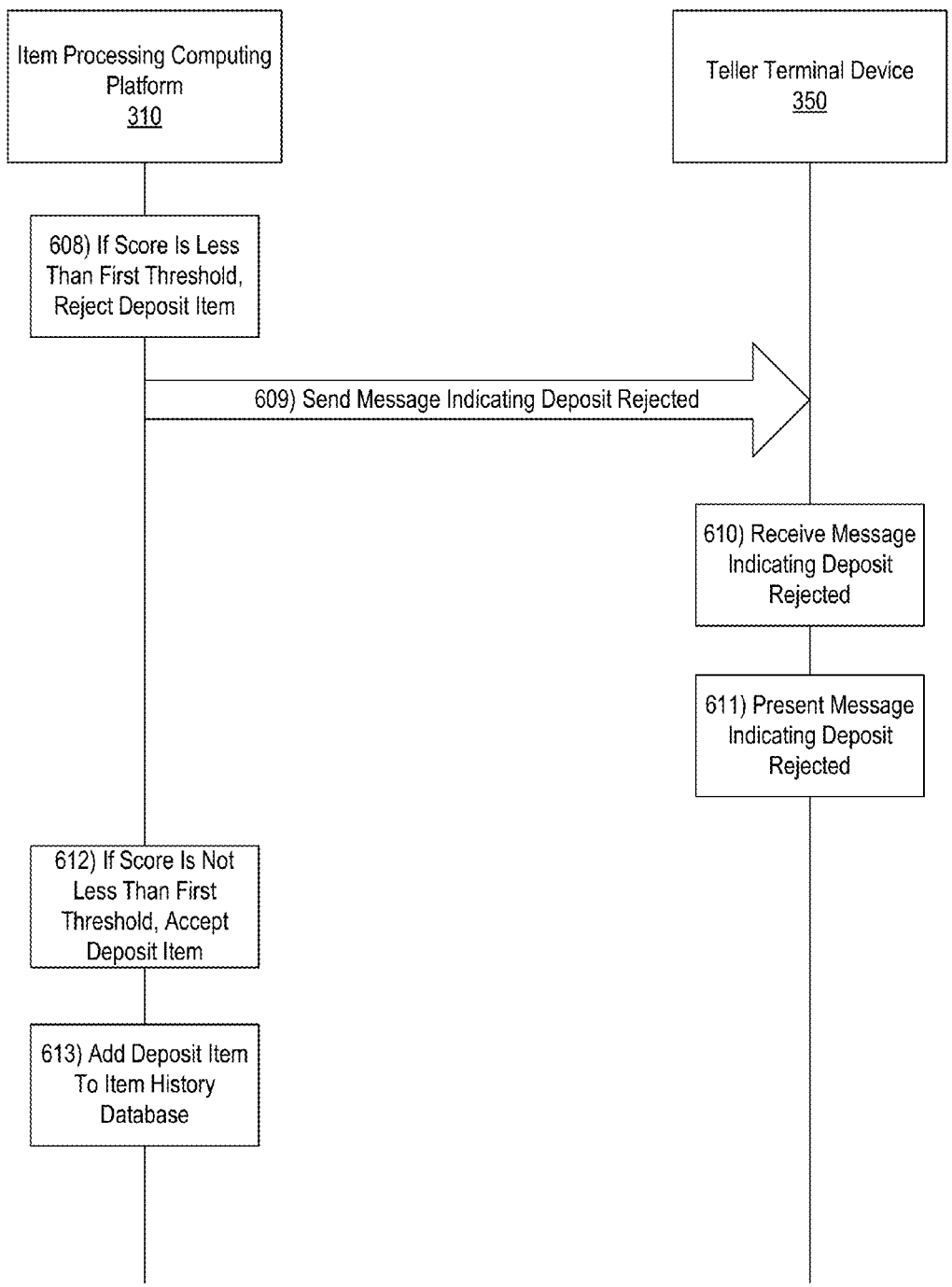
Figure 6C:
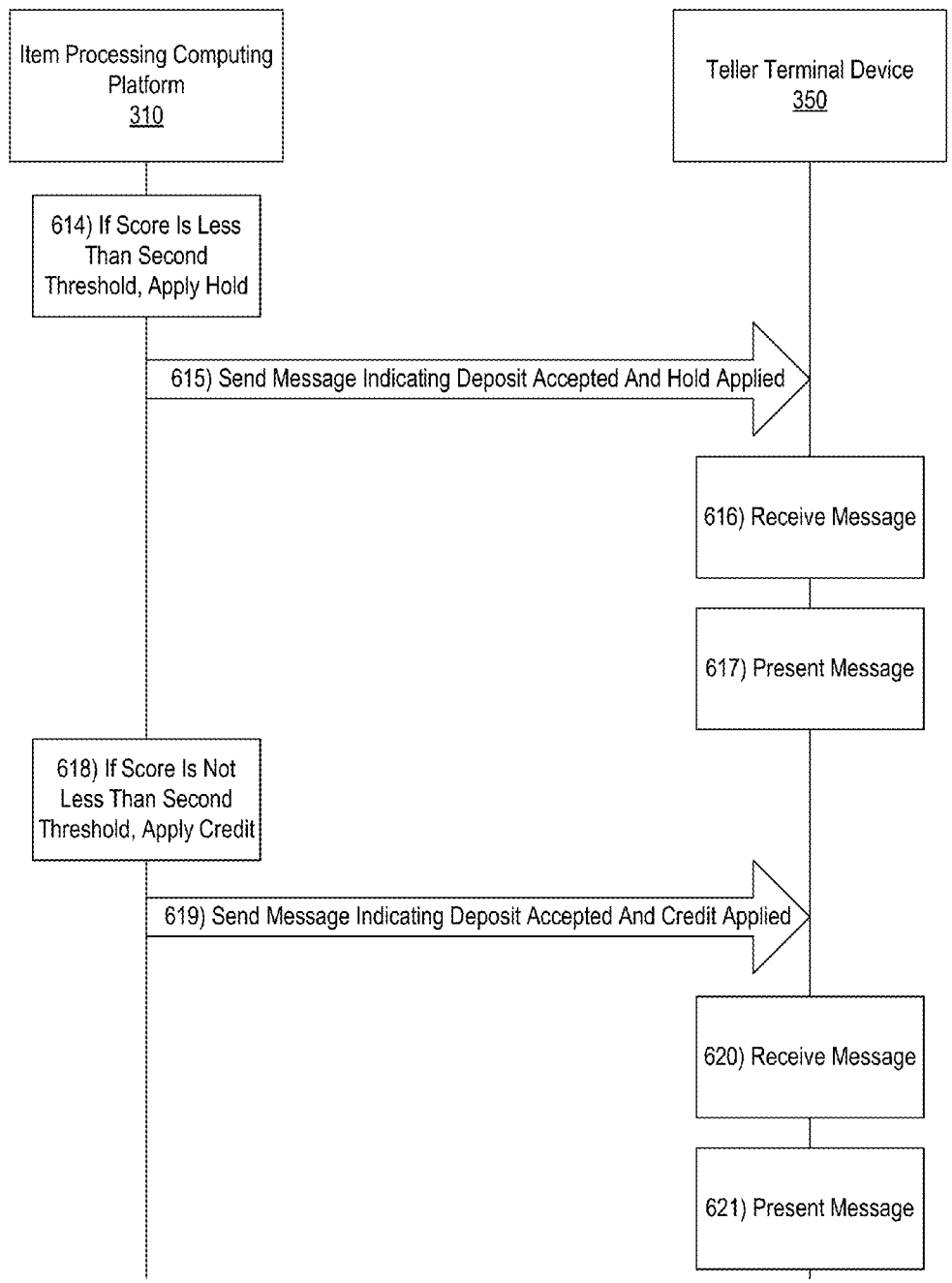

FIGS. 6A-6C depict another illustrative event sequence for detecting duplicate deposit items at a point of capture in accordance with one or more example embodiments. In particular, FIGS. 6A-6C depict an example event sequence illustrating how item processing computing platform 310 may perform duplicate detection on one or more deposit items at the point of capture when teller terminal device 350 is used to capture image data of a deposit item and submit the captured image data to item processing computing platform 310 for processing. As illustrated in greater detail below, teller terminal device 350 may perform several steps in this example event sequence similar to those steps performed by automated teller machine 360 and/or customer mobile device 370 in the example event sequences discussed above with respect to FIGS. 4A-4C and FIGS. 5A-5C.

For example, referring to FIG. 6A, at step 601, teller terminal device 350 may receive input requesting to perform a deposit transaction. In some instances, such input may be received via a teller terminal application on teller terminal device 350 (which may, e.g., present one or more graphical user interfaces on teller terminal device 350 via which such input may be received). Such a teller terminal application may, for instance, provide and/or otherwise include one or more specialized tools and/or functions that are usable by and/or configured to enable a bank teller at a banking center of a financial institution to execute various transactions and/or perform other banking functions on behalf of customers of the financial institution. At step 602, teller terminal device 350 may capture an image of a deposit item. At step 603, teller terminal device 350 may send image data of the deposit item to item processing computing platform 310.

At step 604, item processing computing platform 310 may receive the image data of the deposit item from teller terminal device 350 (e.g., similar to how item processing computing platform 310 may receive image data of a deposit item at step 404). At step 605, item processing computing platform 310 may read a MICR line of the deposit item to obtain MICR information from the MICR line of the deposit item (e.g., similar to how item processing computing platform 310 may read a MICR line of the deposit item at step 405). At step 606, item processing computing platform 310 may perform an image data lift on the image data of the deposit item to extract information from one or more visible fields of the deposit item (e.g., similar to how item processing computing platform 310 may perform an image data lift at step 406). At step 607, item processing computing platform 310 may determine a confidence score for the deposit item (e.g., similar to how item processing computing platform 310 may determine a confidence score at step 407).

Figure 13:
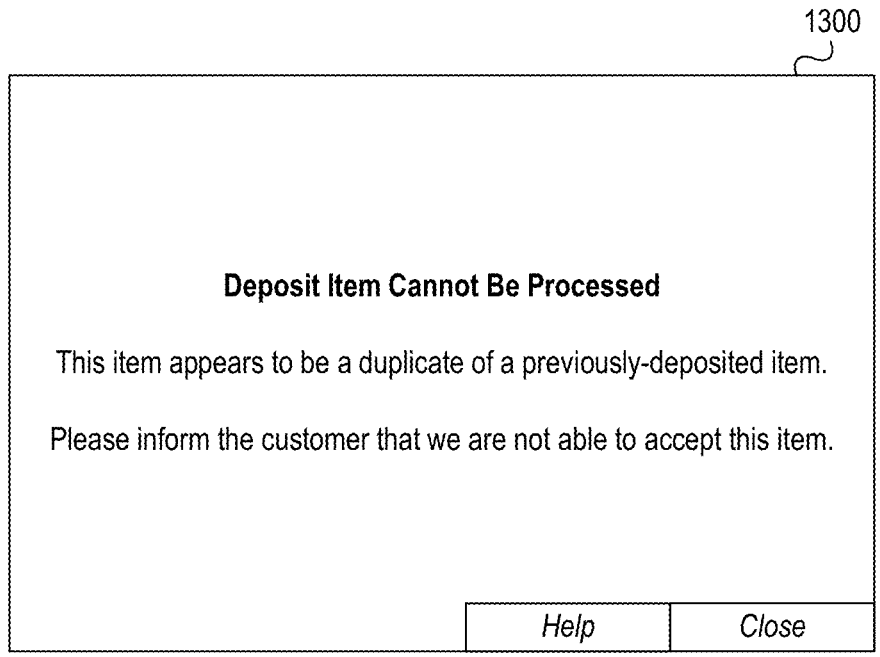

Referring to FIG. 6B, if the confidence score is less than a first threshold, then at step 608, item processing computing platform 310 may reject the deposit item (e.g., similar to how item processing computing platform 310 may reject a deposit item at step 408). After rejecting the deposit item, item processing computing platform 310 may, at step 609, send to teller terminal device 350 a message indicating that the deposit item has been rejected (e.g., similar to how item processing computing platform 310 may send such a message at step 409). For instance, after rejecting the deposit item, item processing computing platform 310 may send such a message to cause teller terminal device 350 to present a notification that includes information indicating that the deposit item has been rejected for deposit based on the deposit item resembling a previously-deposited item. For instance, item processing computing platform 310 may cause teller terminal device 350 to present a graphical user interface that includes such information, similar to the graphical user interface discussed in greater detail below in connection with FIG. 13. At step 610, teller terminal device 350 may receive the message indicating that the deposit item has been rejected. At step 611, teller terminal device 350 may present the message indicating that the deposit item has been rejected. For example, in presenting the message indicating that the deposit item has been rejected, teller terminal device 350 may display, cause to be displayed, and/or otherwise present a graphical user interface similar to graphical user interface 1300, which is illustrated in FIG. 13. As seen in FIG. 13, graphical user interface 1300 may include text and/or information notifying the user of teller terminal device 350 that the deposit item appears to be a duplicate of a previously-deposited item and cannot be accepted for deposit by the financial institution.

Alternatively, if the confidence score is not less than the first threshold, then at step 612, item processing computing platform 310 may accept the deposit item for deposit (e.g., similar to how item processing computing platform 310 may accept a deposit item at step 412). After accepting the deposit item for deposit, item processing computing platform 310 may, at step 613, add the deposit item to an item history database (e.g., similar to how item processing computing platform 310 may add a deposit item to an item history database at step 413).

Referring to FIG. 6C, after accepting the deposit item, item processing computing platform 310 may, in some embodiments, reevaluate the confidence score for the deposit item to determine whether to apply a hold to the deposit item or, alternatively, whether to apply a provisional credit to one or more accounts for the deposit item, similar to how item processing computing platform 310 may reevaluate the confidence score for a deposit item in the example event sequences discussed above.

Figure 14:
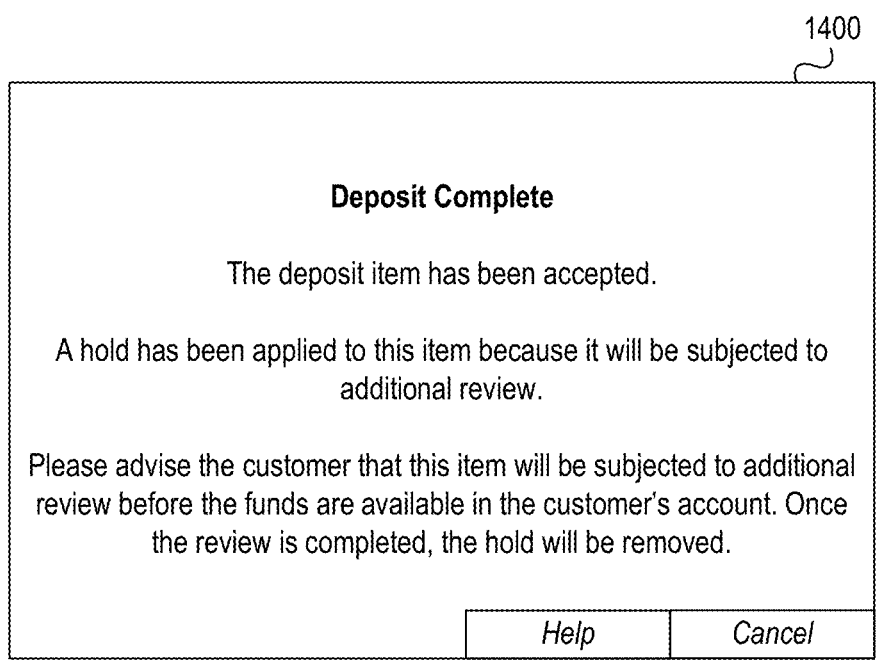

For example, if the confidence score is less than a second threshold, then at step 614, item processing computing platform 310 may apply a hold to the deposit item (e.g., similar to how item processing computing platform 310 may apply a hold to a deposit item at step 414). After applying a hold to the deposit item, item processing computing platform 310 may, at step 615, send to teller terminal device 350 a message indicating that the deposit item has been accepted and that a hold has been applied to the deposit item (e.g., similar to how item processing computing platform 310 may send such a message at step 415). For example, after accepting the deposit item for deposit, item processing computing platform 310 may send such a message to cause teller terminal device 350 to present a notification that includes information indicating that the deposit item has been accepted for deposit. For instance, item processing computing platform 310 may cause teller terminal device 350 to present a graphical user interface that includes such information, similar to the graphical user interfaces discussed in greater detail below in connection with FIGS. 14 and 15. At step 616, teller terminal device 350 may receive the message indicating that the deposit item has been accepted and that the hold has been applied to the deposit item. At step 617, teller terminal device 350 may present the message indicating that the deposit item has been accepted and that the hold has been applied to the deposit item. For example, in presenting the message indicating that the deposit item has been accepted and that the hold has been applied to the deposit item, teller terminal device 350 may display, cause to be displayed, and/or otherwise present a graphical user interface similar to graphical user interface 1400, which is illustrated in FIG. 14. As seen in FIG. 14, graphical user interface 1400 may include text and/or information notifying the user of teller terminal device 350 that the deposit item has been accepted by the financial institution, a hold has been applied to the deposit item to facilitate additional review, and once the additional review is completed, the hold will be removed.

Figure 15:
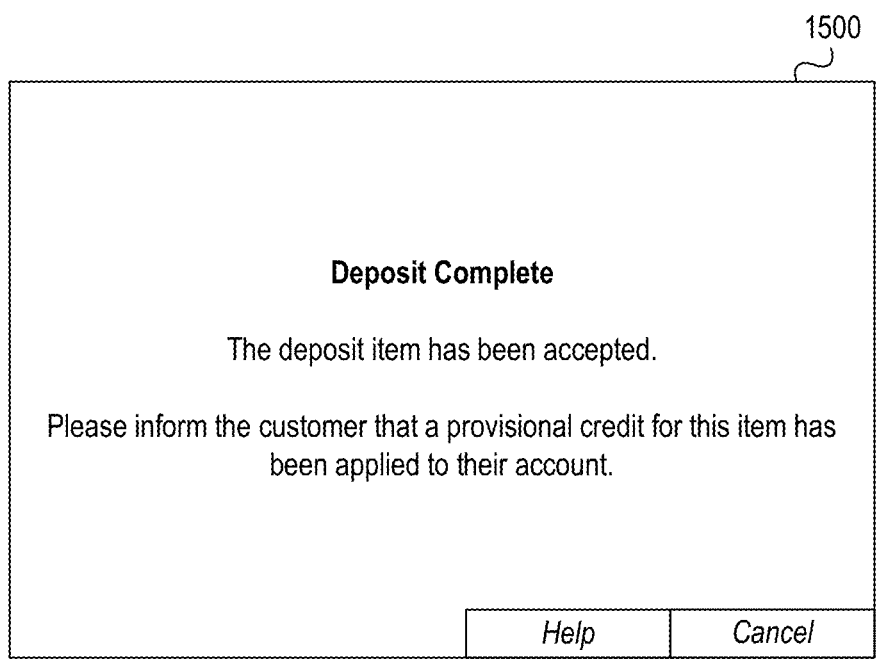

Alternatively, if the confidence score is not less than the second threshold, then at step 618, item processing computing platform 310 may apply a provisional credit for the deposit item to one or more accounts (e.g., similar to how item processing computing platform 310 may apply such a provisional credit at step 418). After applying a provisional credit for the deposit item to one or more accounts, item processing computing platform 310 may, at step 619, send to teller terminal device 350 a message indicating that the deposit item has been accepted and that a provisional credit for the deposit item has been applied to one or more accounts (e.g., similar to how item processing computing platform 310 may send such a message at step 419). For example, after accepting the deposit item for deposit, item processing computing platform 310 may send such a message to cause teller terminal device 350 to present a notification that includes information indicating that the deposit item has been accepted for deposit. At step 620, teller terminal device 350 may receive the message indicating that the deposit item has been accepted and that the provisional credit for the deposit item has been applied to the one or more accounts. At step 621, teller terminal device 350 may present the message indicating that the deposit item has been accepted and that the provisional credit for the deposit item has been applied to the one or more accounts. For example, in presenting the message indicating that the deposit item has been accepted and that the provisional credit for the deposit item has been applied to the one or more accounts, teller terminal device 350 may display, cause to be displayed, and/or otherwise present a graphical user interface similar to graphical user interface 1500, which is illustrated in FIG. 15. As seen in FIG. 15, graphical user interface 1500 may include text and/or information notifying the user of teller terminal device 350 that the deposit item has been accepted by the financial institution and that a provisional credit for the deposit item has been applied to the customer's account.

Figure 16:
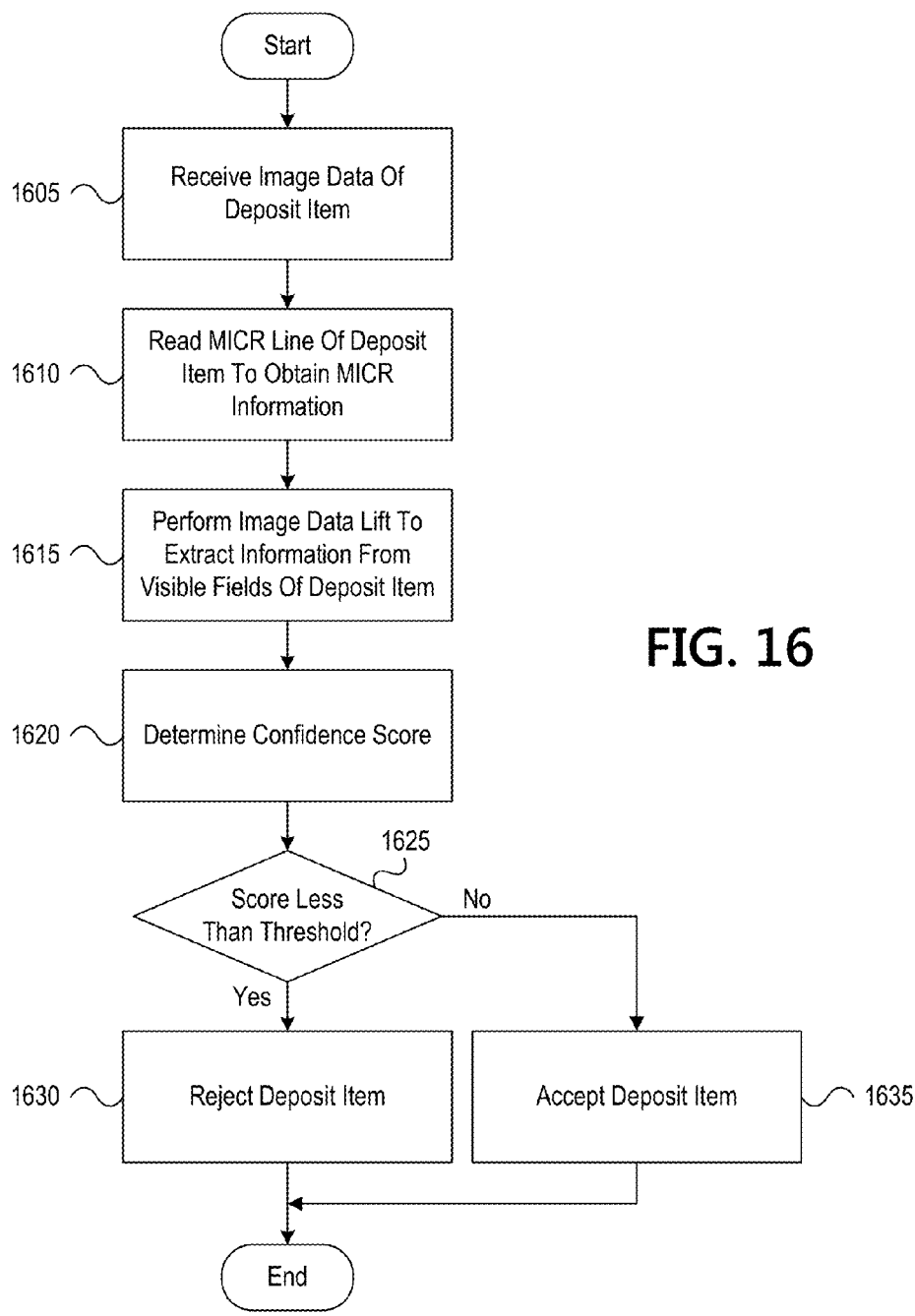
FIG. 16 depicts an illustrative method for detecting duplicate deposit items at a point of capture in accordance with one or more example embodiments.

FIG. 16 depicts an illustrative method for detecting duplicate deposit items at a point of capture in accordance with one or more example embodiments. Referring to FIG. 16, at step 1605, a computing platform may receive image data of a deposit item (e.g., at a time when the deposit item is presented for deposit to a financial institution at a point of capture). At step 1610, the computing platform may read a MICR line of the deposit item to obtain MICR information for the deposit item. At step 1615, the computing platform may perform an image data lift on the deposit item to extract information from one or more visible fields of the deposit item. At step 1620, the computing platform may determine a confidence score indicative of whether the deposit item is a duplicate of a previously-deposited item by comparing the MICR information for the deposit item and the information extracted from the one or more visible fields of the deposit item with item history information obtained from an item history database. At step 1625, the computing platform may determine whether the confidence score is less than a predefined threshold score. If the confidence score is less than the predefined threshold score, then at step 1630, the computing platform may reject the deposit item (e.g., while the deposit item is at the point of capture so as to prevent the deposit item from being accepted by the financial institution). Alternatively, if the confidence score is not less than the predefined threshold score, then at step 1635, the computing platform may accept the deposit item for deposit (e.g., while the deposit item is at the point of capture so as to verify that the deposit item is likely not a duplicate of a previously-deposited item).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
    at least one processor;
    a communication interface communicatively coupled to the at least one processor; and
    memory storing computer-readable instructions that, when executed by the at least one processor, cause the system to:
        receive, via the communication interface, and from a computing device, image data of a deposit item captured by the computing device;
        read a magnetic ink character recognition (MICR) line of the deposit item to obtain MICR information for the deposit item from the MICR line of the deposit item;
        perform an image data lift on the image data of the deposit item to extract information from one or more visible fields of the deposit item;
        compare the MICR information for the deposit item and the information extracted from the one or more visible fields of the deposit item with item history information obtained from an item history database to determine a confidence score indicative of whether the deposit item is a duplicate of a previously-deposited item;
        if the confidence score is less than a first threshold, reject the deposit item;
        if the confidence score is not less than the first threshold, accept the deposit item for deposit;
        if the confidence score is less than a second threshold, apply a hold to the deposit item; and
        if the confidence score is not less than the second threshold, apply a provisional credit to at least one account based on the deposit item,
        wherein the second threshold is greater than the first threshold.

2. The system of claim 1, wherein the computing device is an automated teller machine (ATM) operated by a financial institution operating the system.

3. The system of claim 2, wherein the memory stores additional computer-readable instructions that, when executed by the at least one processor, further cause the system to:
    after rejecting the deposit item, cause the ATM to present a notification comprising information indicating that the deposit item has been rejected for deposit based on the deposit item resembling a previously-deposited item.

4. The system of claim 2, wherein the memory stores additional computer-readable instructions that, when executed by the at least one processor, further cause the system to:
    after accepting the deposit item for deposit, cause the ATM to present a notification comprising information indicating that the deposit item has been accepted for deposit.

5. The system of claim 1, wherein the computing device is a mobile computing device comprising a mobile banking application configured to be used by a customer of a financial institution operating the system.

6. The system of claim 5, wherein the memory stores additional computer-readable instructions that, when executed by the at least one processor, further cause the system to:
    after rejecting the deposit item, cause the mobile computing device to present a notification comprising information indicating that the deposit item has been rejected for deposit based on the deposit item resembling a previously-deposited item.

7. The system of claim 5, wherein the memory stores additional computer-readable instructions that, when executed by the at least one processor, further cause the system to:
  after accepting the deposit item for deposit, cause the mobile computing device to present a notification comprising information indicating that the deposit item has been accepted for deposit.

8. The system of claim 1, wherein the computing device is a teller terminal device configured to be used by a bank teller in a banking center of a financial institution operating the system.

9. The system of claim 8, wherein the memory stores additional computer-readable instructions that, when executed by the at least one processor, further cause the system to:
  after rejecting the deposit item, cause the teller terminal device to present a notification comprising information indicating that the deposit item has been rejected for deposit based on the deposit item resembling a previously-deposited item.

10. The system of claim 8, wherein the memory stores additional computer-readable instructions that, when executed by the at least one processor, further cause the system to:
  after accepting the deposit item for deposit, cause the teller terminal device to present a notification comprising information indicating that the deposit item has been accepted for deposit.

11. The system of claim 1, wherein the memory stores additional computer-readable instructions that, when executed by the at least one processor, further cause the system to:
  after accepting the deposit item for deposit, add new item history information for the deposit item to the item history database based on the MICR information for the deposit item obtained from the MICR line of the deposit item and based on the information extracted from the one or more visible fields of the deposit item.

12. The system of claim 1, wherein the MICR information for the deposit item obtained from the MICR line of the deposit item comprises one or more of a routing number, an account number, a serial number, and an amount.

13. The system of claim 12, wherein the information extracted from the one or more visible fields of the deposit item comprises one or more of a date associated with the deposit item, a name of a payor associated with the deposit item, an address of the payor associated with the deposit item, a memo associated with the deposit item, and a signature associated with the deposit item.

14. A method, comprising:
  at a computing platform comprising at least one processor, memory, and a communication interface:
    receiving, by the at least one processor, via the communication interface, and from a computing device, image data of a deposit item captured by the computing device;
    reading, by the at least one processor, a magnetic ink character recognition (MICR) line of the deposit item to obtain MICR information for the deposit item from the MICR line of the deposit item;
    performing, by the at least one processor, an image data lift on the image data of the deposit item to extract information from one or more visible fields of the deposit item;
    comparing, by the at least one processor, the MICR information for the deposit item and the information extracted from the one or more visible fields of the deposit item with item history information obtained from an item history database to determine a confidence score indicative of whether the deposit item is a duplicate of a previously-deposited item;
    if the confidence score is less than a first threshold, rejecting, by the at least one processor, the deposit item;
    if the confidence score is not less than the first threshold, accepting, by the at least one processor, the deposit item for deposit;
    if the confidence score is less than a second threshold, applying, by the at least one processor, a hold to the deposit item; and
    if the confidence score is not less than the second threshold, applying, by the at least one processor, a provisional credit to at least one account based on the deposit item,
    wherein the second threshold is greater than the first threshold.

15. The method of claim 14, wherein the computing device is an automated teller machine (ATM) operated by a financial institution operating the computing platform.

16. The method of claim 15, further comprising:
  after rejecting the deposit item, causing, by the at least one processor, the ATM to present a notification comprising information indicating that the deposit item has been rejected for deposit based on the deposit item resembling a previously-deposited item.

17. The method of claim 15, further comprising:
  after accepting the deposit item for deposit, causing, by the at least one processor, the ATM to present a notification comprising information indicating that the deposit item has been accepted for deposit.

18. One or more non-transitory computer-readable media storing instructions that, when executed by a computing platform comprising at least one processor, memory, and a communication interface, cause the computing platform to:
  receive, via the communication interface, and from a computing device, image data of a deposit item captured by the computing device;
  read a magnetic ink character recognition (MICR) line of the deposit item to obtain MICR information for the deposit item from the MICR line of the deposit item;
  perform an image data lift on the image data of the deposit item to extract information from one or more visible fields of the deposit item;
  compare the MICR information for the deposit item and the information extracted from the one or more visible fields of the deposit item with item history information obtained from an item history database to determine a confidence score indicative of whether the deposit item is a duplicate of a previously-deposited item;
  if the confidence score is less than a first threshold, reject the deposit item;
  if the confidence score is not less than the first threshold, accept the deposit item for deposit;
  if the confidence score is less than a second threshold, apply a hold to the deposit item; and
  if the confidence score is not less than the second threshold, apply a provisional credit to at least one account based on the deposit item,
  wherein the second threshold is greater than the first threshold.

* * * * *